(12) United States Patent
Kajino et al.

(10) Patent No.: US 8,116,939 B2
(45) Date of Patent: Feb. 14, 2012

(54) SUSPENSION SYSTEM FOR VEHICLE

(75) Inventors: Hidenori Kajino, Nagoya (JP);
Jae-Sung Cho, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 12/936,341

(22) PCT Filed: May 1, 2009

(86) PCT No.: PCT/JP2009/058876
§ 371 (c)(1),
(2), (4) Date: Oct. 4, 2010

(87) PCT Pub. No.: WO2009/145053
PCT Pub. Date: Dec. 3, 2009

(65) Prior Publication Data
US 2011/0160960 A1 Jun. 30, 2011

(30) Foreign Application Priority Data
May 27, 2008 (JP) ................................. 2008-138230

(51) Int. Cl.
*B60G 17/016* (2006.01)
(52) U.S. Cl. ........................................ 701/38; 701/37
(58) Field of Classification Search .................... 701/36, 701/37, 38; 280/5.5, 5.515
See application file for complete search history.

(56) References Cited

U.S. PATENT DOCUMENTS

| | | | |
|---|---|---|---|
| 4,973,077 A * | 11/1990 | Kuwayama et al. | ... 280/124.107 |
| 5,060,959 A | 10/1991 | Davis et al. | |
| 5,102,162 A * | 4/1992 | Okuda et al. | ............... 280/5.508 |
| 5,158,320 A * | 10/1992 | Ando et al. | ............ 280/124.142 |
| 5,497,324 A | 3/1996 | Henry et al. | |
| 7,962,261 B2 * | 6/2011 | Bushko et al. | .................. 701/37 |

FOREIGN PATENT DOCUMENTS

| EP | 0 539 063 A1 | 4/1993 |
|---|---|---|
| EP | 1 445 132 A2 | 8/2004 |

(Continued)

OTHER PUBLICATIONS

International Search Report in International Application No. PCT/JP2009/058876, dated Nov. 4, 2009.

(Continued)

*Primary Examiner* — Isam Alsomiri
(74) *Attorney, Agent, or Firm* — Oliff & Berridge, PLC

(57) ABSTRACT

A suspension system for a vehicle, including (a) four displacement force generators (152) each configured to generate a displacement force forcing sprung and unsprung portions of the vehicle toward or away from each other; and (b) a control unit (200) configured to control the displacement force that is to be generated by each displacement force generator. The control unit is capable of executing a plurality of vibration damping controls concurrently with each other, by controlling the displacement force, so as to damp a composite vibration containing a plurality of different vehicle-body vibrations which are to be damped by the respective vibration damping controls. The control unit is configured to refrain from executing at least one of the vibration damping controls for damping one of the vehicle-body vibrations that is not required to be damped, in a low vibration intensity situation in which intensities of sprung-portion resonance-frequency vibration components in respective four sprung portions of the vehicle are lower than a threshold intensity degree.

21 Claims, 18 Drawing Sheets

FOREIGN PATENT DOCUMENTS

| | | |
|---|---|---|
| EP | 1 568 521 A2 | 8/2005 |
| EP | 1 829 718 A1 | 9/2007 |
| EP | 1 867 503 A1 | 12/2007 |
| EP | 1 870 266 A1 | 12/2007 |
| JP | 11147412 A * | 6/1999 |
| JP | A-2003-194844 | 7/2003 |
| JP | A-2005-238972 | 9/2005 |
| JP | A-2006-082751 | 3/2006 |
| JP | A-2007-302194 | 11/2007 |
| JP | A-2007-331513 | 12/2007 |

OTHER PUBLICATIONS

Written Opinion of the International Searching Authority in International Application No. PCT/JP2009/058876, dated Nov. 4, 2009.
International Preliminary Report on Patentability in International Application No. PCT/JP2009/058876, dated Oct. 1, 2010.
Oct. 25, 2011 Office Action issued in Japanese Patent Application No. 2008-138230 (with English Translation).

* cited by examiner

FIG.20A

|  | BOUNCE INTENSITY LARGE | | BOUNCE INTENSITY SMALL | |
|---|---|---|---|---|
|  | PITCH INTENSITY LARGE | PITCH INTENSITY SMALL | PITCH INTENSITY LARGE | PITCH INTENSITY SMALL |
| ROLL INTENSITY LARGE | A | B | E | F |
| ROLL INTENSITY SMALL | C | D | G | H |

FIG.20B

|  | $K_b$ (BOUNCE) | $K_R$ (ROLL) | $K_P$ (PITCH) |
|---|---|---|---|
| A | 1 | 1 | 1 |
| B | 1 | 1 | 0 |
| C | 1 | 0 | 1 |
| D | 1 | 0 | 0 |
| E | 0 | 1 | 1 |
| F | 0 | A | 0 |
| G | 0 | 0 | 1 |
| H | 0 | 0 | 0 |

SUSPENSION SYSTEM FOR VEHICLE

This application is based on Japanese Patent Application No. 2008-138230 filed on May 27, 2008, the content of which is incorporated hereinto by reference.

TECHNICAL FIELD

The present invention relates to a suspension system for a vehicle, which is provided with a device including an electromagnetic motor and configured to generate, based on a force generated by the electromagnetic motor, a displacement force causing sprung and unsprung portions of the vehicle to be displaced toward or away from each other.

BACKGROUND ART

In recent years, there is a study of, as a suspension system that is to be provided in a vehicle, a suspension system including displacement force generators provided for respective wheels of the vehicle, wherein each of the displacement force generators includes an electromagnetic motor, and is configured to generate, based on a motor force generated by the electromagnetic motor, a displacement force causing sprung and unsprung portions of the vehicle to be displaced toward or away from each other. For example, there is a system in which each of the displacement force generators is arranged to function as an electromagnetic shock absorber. JP-2005-238972A discloses a system equipped with a so-called active stabilizer. In these days, there is a study of such a stabilizer of right/left independent type. JP-2006-82751A discloses a system in which a stabilizer of right/left independent type is partially constituted by the displacement force generators. The system equipped with the displacement force generators is expected as a high-performance system, owing to its ability of easily establishing a vibration damping characteristic based on so-called skyhook damper theory and ability of effectively reducing change of posture of body of the vehicle.

DISCLOSURE OF THE INVENTION

In the suspension system equipped with the displacement force generators, it is possible that each of the displacement force generators is arranged to generate the displacement force as a damping force for damping vibration occurring in the vehicle body, which vibration can be considered as a composite vibration containing a plurality of vehicle-body vibrations that are different in kind from each other. However, there is a problem that the suspension system fails to provide satisfactory ride comfort, because the vibration cannot be effectively damped due to difficulty for actuation of each displacement force generator to sufficiently follow the vibration, particularly, when frequency of the vibration is high, and because the displacement force is generated with a delay relative to the vibration having relatively high frequency. The suspension system provided with such a displacement force generator is still in a developing stage and there is still room for improvements. That is, it is considered that the practicability of the system can be increased by various improvements applied to the system. The present invention was made in the light of the background art discussed above, and has an object of the invention to provide a vehicle suspension system having a high practicability.

This object may be achieved according to the principle of this invention, which provides a suspension system for a vehicle, including a control unit capable of executing a plurality of vibration damping controls concurrently with each other, for damping the above-described plurality of vehicle-body vibrations, respectively, such that the control unit is configured, in a low vibration intensity situation in which intensities of sprung-portion resonance-frequency vibration components in respective four sprung portions of the vehicle are lower than a threshold intensity degree, to refrain from executing at least one of the plurality of vibration damping controls, each of which is to be executed for damping one of the plurality of vehicle-body vibrations that is not required to be damped in the low vibration intensity situation.

In the suspension system according to the invention, when the vehicle-body vibrations are constituted principally by relatively low-frequency vibrations such as vibrations of sprung-portion resonance-frequency range, the vehicle-body vibrations are effectively damped by the displacement force that is generated by each of the displacement force generators. When the vehicle-body vibrations are constituted principally by relatively high-frequency vibrations, it is possible to restrain deterioration of ride comfort of the vehicle, by limiting generation of the displacement force that could affect performance of damping such vibrations of relatively high frequency range. The suspension system of the present invention provides such a technical advantage, and accordingly has a high practicability.

There will be described various modes of the invention (hereinafter referred to as "claimable invention" where appropriate) deemed to contain claimable features for which protection is sought. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiment of the invention. In a limit in accordance with such an interpretation, a mode of the claimable invention can be constituted by not only any one of these modes but also either a mode provided by any one of these modes and additional component or components incorporated therein and a mode provided by any one of these modes without some of components recited therein.

(1) A suspension system for a vehicle having front right, front left, rear right and rear left wheels, four sprung portions and four unsprung portions, the suspension system comprising:

(a) four displacement force generators provided for the respective four wheels of the vehicle, each of the four displacement force generators including an electromagnetic motor and configured to generate, based on a motor force generated by the electromagnetic motor, a displacement force forcing a corresponding one of the four sprung portions and a corresponding one of the four unsprung portions toward or away from each other; and (b) a control unit configured to control actuation of the electromagnetic motor included in each of the four displacement force generators, so as to control the displacement force that is to be generated by each of the four displacement force generators, wherein the control unit is configured to be capable of executing a plurality of vibration damping controls concurrently with each other, by controlling the displacement force based on a sum of vibration damping components as displacement force components that are to be directed to the respective vibration damping controls, so as to damp a composite vibration containing a plurality of vehicle-body vibrations which are different in kind from each other and which are to be damped by the respective vibration damping controls, and wherein the control unit is configured to refrain from executing at least one of the plurality of vibration damping controls in a low vibration intensity situation in which intensities of sprung-portion resonance-frequency vibration components in the respective four sprung portions are lower than a threshold intensity degree, each of the at least one of the plurality of vibration damping controls being to be executed for damping one of the plurality of vehicle-body vibrations that is not required to be damped in the low vibration intensity situation, each of the sprung-portion resonance-frequency vibration components being a component of sprung-portion vibration occurring in a corresponding one of the four sprung portions and having a resonance frequency of the corresponding one of the four sprung portions.

In a suspension system equipped with the above-described displacement force generators, the displacement force generated by each of the displacement force generators can act as a damping force for damping vibration occurring in the vehicle body, for thereby making it possible to damp the vibration. However, the higher the frequency of the vibration is, the more difficult for the displacement force generators to be actuated without delay relative to the vibration. That is, upon occurrence of the vibration of relatively high frequency range, the vibration could not be effectively damped by the displacement force, and ride comfort of the vehicle could be made even worse rather than being made better, due to influence caused by generation of the displacement force with delay relative to the vibration of relatively high frequency range.

In the suspension system according to this mode (1), the plurality of vibration damping controls can be executed for damping vibration occurring in the vehicle body, which vibration can be considered as the composite vibration containing the plurality of vehicle-body vibrations that are different in kind from each other, so that the plurality of vehicle-body vibrations can be damped by respective damping forces generated by the displacement force generators in the respective vibration damping controls. In the low vibration intensity situation in which the intensities of the sprung-portion resonance-frequency components in the respective four sprung portions are relatively low, namely, in a situation in which the vehicle-body vibrations are constituted principally by relatively high-frequency vibrations, each of the plurality of vibration damping controls is executed as little as possible, namely, only required one or ones of the plurality of vibration damping controls are executed, so that the control unit is configured to refrain from executing one or ones of the plurality of vibration damping controls that are to be executed for damping one or ones of the plurality of vehicle-body vibrations that are not currently required to be damped in the low vibration intensity situation, namely, so that the control unit is configured not to execute the one or ones of the plurality of vibration damping controls when the one or ones of the plurality of vehicle-body vibrations are not required to be damped in the low vibration intensity situation. That is, in the suspension system according to this mode (1), when the vehicle-body vibrations are constituted principally by relatively high-frequency vibrations, it is possible to restrain deterioration of the ride comfort, by limiting generation of the displacement force that could affect performance of damping such vibrations of relatively high frequency range.

Each of the sprung-portion resonance-frequency vibration components is a component of the sprung-portion vibration occurring in a corresponding one of the four sprung portions.

The term "low vibration intensity situation" may be interpreted to mean a situation in which the intensities of the sprung-portion resonance-frequency vibration components, whose frequency is, for example, higher than 0.1 Hz and lower than 3.0 Hz, are relatively low. The term "intensity" may be interpreted to mean a degree of strength of the sprung-portion resonance-frequency vibration component. It is possible to judge that the vehicle is in the low vibration intensity situation, for example, when amplitude, velocity or/and acceleration of the sprung-portion resonance-frequency vibration component is relatively small. It is preferable that the intensity is a value detected or measured within a predetermined length of time up to a current point of time. For example, the intensity may be a maximum value or effective value detected or measured within the predetermined length of time. It is noted that the term "low vibration intensity situation" should be interpreted to mean a situation in which all of the intensities of the sprung-portion resonance-frequency vibration components in the respective four sprung portions are lower than the threshold intensity degree.

It might be possible to construct the system such that the displacement force generated by each displacement force generator is made constantly small since the performance of each displacement force generator for damping vibration of relatively high frequency range is low. However, in such a construction, the displacement force is suppressed not only upon occurrence of vibration of relatively high frequency range but also upon occurrence of vibration of relatively low frequency range that can be sufficiently followed by actuation of each displacement force generator. In the suspension system according to this mode (1), it is possible to effectively damp the vibration of the sprung-portion resonance-frequency range which can be sufficiently followed by actuation of each displacement force generator.

Each of the "displacement force generators" recited in this mode (1) may have a construction that is not particularly limited. For example, each displacement force generator may be provided by a stabilizer of so-called right/left independent type, namely, a device which includes an elastic body connected to one of the corresponding sprung portion and the corresponding unsprung portion, and an actuator configured to deform the elastic body, such that an actuator force generated by the actuator is transmitted to the corresponding sprung and unsprung portions via the elastic body so as to act as the displacement force. Further, each displacement force generator may be provided by an electromagnetic shock absorber, too, namely, a device which includes a sprung-portion side unit and an unsprung-portion side unit which are connected to the corresponding sprung and unsprung portions, respectively, and which are to be moved relative to each other by movement of the corresponding sprung and unsprung portions relative to each other, such that the device is configured to generate, based on the motor force generated by the electromagnetic motor, a force acting against the relative movement of the sprung-portion side unit and the unsprung-portion side unit.

Further, each of the "four sprung portions" recited in this mode (1) may be broadly interpreted to mean a portion of the vehicle body that is supported by a suspension spring of the vehicle, while each of the "four unsprung portion" recited in this mode (1) may be broadly interpreted to mean a suspension arm or other vehicle component that is vertically movable together with an axle shaft of the vehicle.

Each of the displacement force generators may be adapted to generate, as the displacement force, a drive force, i.e., a force positively causing the corresponding one of the sprung portions and the corresponding one of the unsprung portions to be displaced toward or away from each other against an external force acting on the displacement force generator, and also, as the displacement force, a maintaining force, i.e., a force inhibiting the corresponding sprung portion and the corresponding unsprung portion from being displaced relative to each other by an external force acting on the displacement force generator. That is, the "control unit" recited in this mode (1) is capable of executing the above-described plurality of vibration damping controls, by utilizing the displacement force which is generated by each displacement force generator and which can serve as various kinds of forces. Further, the control unit may be configured to execute, in addition to the plurality of vibration damping controls, a control executed based on a so-called skyhook damper theory for damping the sprung-portion vibration occurring in each of the four sprung portions (that correspond to the respective four wheels) and a control executed for restraining or reducing change of posture of the vehicle body such as roll of the vehicle body that arises from turning of the vehicle and pitch of the vehicle body that arises from acceleration or deceleration of the vehicle.

(2) The suspension system according to mode (1), wherein the control unit is configured to judge whether the vehicle is in the low vibration intensity situation, based on sprung-portion velocities as vertical movement velocities of the respective four sprung portions.

In general, when the vehicle is running on a rough road surface, the velocity of vertical movement of each of the four sprung portions is considered to be relatively low, since the vibration transmitted to each of the four sprung portions from a corresponding one of the unsprung portions has a high frequency and a small amplitude. On the other hand, when the vehicle is running over a protrusion or a recess on the road surface, the velocity of vertical movement of each of the four sprung portions is considered to be relatively high, since vibration transmitted to each of the four sprung portions from a corresponding one of the unsprung portions has a low frequency and a large amplitude. Therefore, it is possible to judge whether the vehicle is in the above-described low vibration intensity situation, based on the sprung-portion velocity, for example, by comparing the sprung-portion velocities with a threshold velocity value that is suitably determined. In the suspension system according to this mode (2), the above-described at least one of the plurality of vibration damping controls is not executed, for example, when all of the sprung-portion velocities as velocities of vertical movements of the respective four sprung portions are lower than the threshold velocity value.

(3) The suspension system according to mode (1) or (2), wherein the control unit is configured to be capable of executing, as the plurality of vibration damping controls, a roll-vibration damping control, a pitch-vibration damping control and a bounce-vibration damping control that are to be executed for damping roll, pitch and bounce vibrations, respectively, as the plurality of vehicle-body vibrations.

In the suspension system according to this mode (3), the roll-vibration damping control, pitch-vibration damping control and bounce-vibration damping control are executable as the plurality of vibration damping controls, for damping the composite vibration containing the plurality of vehicle-body vibrations which are different from each other with respect to their relations with a center of gravity of the vehicle body. It is possible to determine amounts of respective displacement force components which are to be generated in the respective vibration damping controls, namely, which are to be directed to damp the respective vehicle-body vibrations, i.e., roll vibration, pitch vibration and bounce vibration. The roll vibration may be defined as rotary vibration acting in a circumferential direction about an axis which passes the center of gravity of the vehicle body and which extends in a longitudinal direction of the vehicle. The pitch vibration may be defined as rotary vibration acting in a circumferential direction about an axis which passes the center of gravity of the vehicle body and which extends in a lateral direction of the vehicle. The bounce vibration may be defined as vertical vibration which occurs at the center of gravity of the vehicle body and which acts in a vertical direction of the vehicle.

(4) The suspension system according to any one of modes (1)-(3), wherein the control unit is configured to be capable of executing, as one of the plurality of vibration damping controls, at least a roll-vibration damping control that is to be executed for damping a roll vibration as one of the plurality of vehicle-body vibrations, and wherein the control unit is configured, in the low vibration intensity situation, to refrain from executing the roll-vibration damping control when an intensity of the roll vibration is not higher than a threshold intensity degree.

(5) The suspension system according to any one of modes (1)-(4), wherein the control unit is configured to be capable of executing, as one of the plurality of vibration damping controls, at least a pitch-vibration damping control that is to be executed for damping a pitch vibration as one of the plurality of vehicle-body vibrations, and wherein the control unit is configured, in the low vibration intensity situation, to refrain from executing the pitch-vibration damping control when an intensity of the pitch vibration is not higher than a threshold intensity degree.

(6) The suspension system according to any one of modes (1)-(5), wherein the control unit is configured to be capable of executing, as one of the plurality of vibration damping controls, at least a bounce-vibration damping control that is to be executed for damping a bounce vibration as one of the plurality of vehicle-body vibrations, and wherein the control unit is configured, in the low vibration intensity situation, to refrain from executing the bounce-vibration damping control when an intensity of the bounce vibration is not higher than a threshold intensity degree.

In the suspension system according to each of modes (4)-(6), it is possible to judge that each of the vibration damping controls has to be executed when the intensity of the vibration which is to be damped by the each of the vibration damping controls is higher than the threshold intensity degree. Described specifically, for example, the intensity of the bounce vibration can be estimated based on a vertical acceleration of the vehicle body which can be presented by, for example, an average of vertical accelerations of the respective four sprung portions that correspond to the respective four wheels. The intensity of each of the roll vibration and pitch vibration as the rotary vibrations can be estimated, for example, based on an angle of inclination of the vehicle body. The angle of inclination of the vehicle body can be estimated by using, for example, an acceleration sensor. Where the acceleration sensor includes a pendulum movable in a predetermined direction and is configured to detect an acceleration in the predetermined direction based on the movement of the pendulum, the angle of inclination of the vehicle body can be estimated based on the movement of the pendulum, namely, the intensities of the roll vibration and pitch vibration can be estimated based on the movement of the pendulum.

(7) The suspension system according to any one of modes (1)-6), wherein the control unit is configured, upon execution of each of the plurality of vibration damping controls, to determine a corresponding one of the vibration damping components that is to be directed to the each of the plurality of vibration damping controls, based on a velocity of a corresponding one of the plurality of vehicle-body vibrations that is to be damped by the each of the plurality of vibration damping controls, and wherein each of the four displacement force generators is controlled by the control unit so as to generate, upon execution of the each of the plurality of vibration damping controls, the displacement force such that an amount of the generated displacement force is based on the corresponding one of the vibration damping components.

In the suspension system according to this mode (7), each of the four displacement force generators is controlled to generate, upon execution of each of the plurality of vibration damping controls, the displacement force, i.e., the damping force whose amount is dependent on one of movement velocities of the vehicle body which represents a corresponding one of the vehicle-body vibrations that is to be damped by the each of the plurality of vibration damping controls, namely, dependent on one of a bounce velocity, a roll velocity and a pitch velocity which represents a corresponding one of the vehicle-body vibrations that is to be damped by the each of the plurality of vibration damping controls. In the suspension system according to this mode (7), for example, each of the vibration damping components may be determined to be proportional to the velocity of the corresponding one of the plurality of vehicle-body vibrations, so that the displacement force can be generated as the damping force whose amount is suitable for damping the corresponding one of the plurality of vehicle-body vibrations.

(8) The suspension system according to mode (7), wherein the control unit is configured to estimate the velocity of the corresponding one of the plurality of vehicle-body vibrations, based on sprung-portion velocities as vertical movement velocities of the respective four sprung portions.

Where the plurality of vehicle-body vibrations are different from each other with respect to their relations with a center of gravity of the vehicle body, the above-described one of the movement velocities of the vehicle body (which represents a corresponding one of the vehicle-body vibrations that is to be damped by the each of the plurality of vibration damping controls) may be estimated based on the sprung-portion velocities as velocities of vertical movements of the respective four sprung portions and distances of the respective four wheels from the center of gravity of the vehicle body.

(9) The suspension system according to mode (8), further comprising a vibration phase advancer that is configured to obtain advanced sprung-portion vibrations by advancing phase of the sprung-portion vibration that occurs in each of the four sprung portions, such that the sprung-portion velocities are the vertical movement velocities of the respective four sprung portions in the advanced sprung-portion vibrations, whereby the velocity of the corresponding one of the plurality of vehicle-body vibrations is estimated based on the advanced sprung-portion vibrations.

Each of the displacement force generators has a response delay that is a length of time from a point of time at which a command indicative of a target amount of the displacement force is issued by the control unit to a point of time at which an actual amount of the displacement force (acting on the corresponding sprung and unsprung portions) reaches the target amount. In view of such a response delay of the displacement force generators, indexes (each of which is to be used upon determination of an amount of the displacement force) may be subjected to a phase advance processing in which a phase of each index is advanced by the vibration phase advancer, so that the displacement force is controlled based on the indexes that have been subjected to the phase advance processing. For example, the vibration phase advancer may be configured to advance phase of the sprung-portion resonance-frequency vibration component by a predetermined degree. In general, where the vibration having a frequency higher than the sprung-portion resonance frequency is subjected to the phase advance processing performed by the vibration phase advancer, the phase and amplitude of such a higher frequency vibration are changed by degrees, which are increased with increase of the frequency due to characteristics of the vibration phase advancer. That is, where the displacement force components (that are to be directed to the respective vibration damping controls) are determined based on the vehicle-body vibrations estimated from the sprung-portion velocities that have been subjected to the phase advance processing, the vibration of relatively high frequency range could not be effectively damped and there is even a risk that the ride comfort could be made even worse rather than being made better. Therefore, the arrangement in which the plurality of vibration damping controls are executed as little as possible is effective particularly in the suspension system according to this mode (8).

The "vibration phase advancer" recited in this mode (10) may have characteristics that are not particularly limited. For example, a vertical acceleration sensor may be provided in each one of the four sprung portions, so as to detect an acceleration of each one of the four sprung portions, so that the sprung-portion velocity (as the velocity of each one of the four sprung portions) is obtained as an integral of the detected acceleration. That is, the vibration phase advancer may have a characteristic by which phase of the thus obtained sprung-portion velocity is advanced by taking account of phase of the detected acceleration. Further, the vibration phase advancer may have a construction that is not particularly limited. For example, the vibration phase advancer may be constructed to include a computer or circuit that serves exclusively to advance the phase, or a general purpose computer which is used not only for the phase advance processing but also for the other purposes and which includes a portion assigned to execute a phase advancing program that is stored in the computer.

(11) The suspension system according to any one of modes (1)-(9), further comprising:

(c) four suspension springs provided for the respective four wheels, each of the four suspension springs elastically interconnecting between a corresponding one of the four sprung portions and a corresponding one of the four unsprung portions; and (d) four hydraulic shock absorbers provided for the respective four wheels, each of the four hydraulic shock absorbers being configured to generate a damping force against displacement of a corresponding one of the four sprung portions and a corresponding one of the four unsprung portions relative to each other.

In the suspension system according to this mode (11), the suspension spring, shock absorber and displacement force generator are provided for each of the four wheels, so as to be parallel with one another. In the present suspension system, even when vibration occurring in the unsprung portion has a frequency which is so high that the vibration is difficult to be followed by actuation of the displacement force generator, it is possible to effectively restrain transmission of the high frequency vibration to the sprung portion, for example, by suitably tuning damping coefficient of the shock absorber. The damping coefficient of the shock absorber correlates with transmittability of vibration from the unsprung portion to the sprung portion, and vibration of relatively high frequency range becomes difficult to be transmitted from the unsprung portion to the sprung portion, in general, as the damping coefficient becomes lower. Therefore, in view of the transmittability of vibration of relatively high frequency range, it is desirable that the damping coefficient of the shock absorber is relatively low. For example, it is desirable that the damping coefficient is within a range from 1000 to 2000 N·sec/m (that is a range obtained under an assumption that the damping force is arranged to act directly on the vehicle body and wheel that are displaced relative to each other, rather than to act on actuation of the shock absorber that arises from the displacement of the sprung and unsprung portions relative to each other).

(12) The suspension system according to mode (11), wherein each of the four hydraulic shock absorbers has a damping coefficient changer configured to change a damping coefficient of the each of the four hydraulic shock absorbers which corresponds to ability of the each of the four hydraulic shock absorbers for generating the damping force such that an amount of the generated damping force is based on the damping coefficient, and wherein the control unit is configured to control the damping coefficient changer of each of the four hydraulic shock absorbers, for thereby controlling the damping coefficient of the each of the four hydraulic shock absorbers.

The "damping coefficient changer" recited in this mode (12) may be configured to change the damping coefficient in a continuous manner, or may be configured to change the damping coefficient in a stepwise manner such that the damping coefficient is set to one of at least two values.

(13) The suspension system according to mode (12), wherein the four hydraulic shock absorbers consist of two front-side shock absorbers provided for the front wheels and two rear-side shock absorbers provided for the rear wheels, and wherein the control unit is configured to control the damping coefficient of each of the four hydraulic shock absorbers, for thereby selectively establishing a first state in which the damping coefficient of each of the two front-side shock absorbers is made larger than the damping coefficient of each of the two rear-side shock absorbers and a second state in which the damping coefficient of each of the two rear-side shock absorbers is made larger than the damping coefficient of each of the two front-side shock absorbers, and thereby selectively establishing a pitch reduction state suitable for reducing a pitch vibration as one of the plurality of vehicle-body vibrations and a roll reduction state suitable for reducing a roll vibration as one of the plurality of vehicle-body vibrations, by selectively establishing the first and second states.

In a conventional suspension system equipped with shock absorbers each having the damping coefficient changer, the damping coefficients of all the shock absorbers (provided for the respective four wheels) are increased for reducing pitch vibration and roll vibration occurring in the vehicle body during running of the vehicle. However, in this arrangement in which the damping coefficients of all the shock absorbers (provided for the respective four wheels) are increased, transmittability of the vibration of relatively high frequency, range from the unsprung portion to the sprung portion is also increased whereby the ride comfort is deteriorated.

In the suspension system according to this mode (13), it is possible to establish a state suitable for reducing the pitch vibration or roll vibration, by establishing, as needed, a difference between the damping coefficient of each front-side shock absorber (hereinafter simply referred to as "front-side damping coefficient" where appropriate) and the damping coefficient of each rear-side shock absorber (hereinafter simply referred to as "rear-side damping coefficient" where appropriate), which are set to be substantially equal to each other in a normal state. For example, in the present suspension system, the pitch reduction state or roll reduction state can be established, for example, with one of the front-side damping coefficient and rear-side damping coefficient being made larger than its normal value, and with the other of the front-side damping coefficient and rear-side damping coefficient being made smaller than its normal value or with the other being held in its normal value. Whether the pitch reduction state or roll reduction state is established is dependent on which one of the front-side damping coefficient and rear-side damping coefficient is made larger than the other. It varies from vehicle to vehicle, as described later in detail, which one of the first state (in which the front-side damping coefficient is larger than the rear-side damping coefficient) and the second state (in which the rear-side damping coefficient is larger than the front-side damping coefficient) corresponds to the pitch reduction state or the roll reduction state. In the present suspension system, it is possible to damp vibration of relatively high frequency by a certain degree while reducing the pitch vibration or roll vibration, and accordingly making it possible to restrain deterioration of the ride comfort.

There will be described how the pitch vibration or roll vibration can be reduced by establishing a difference between the front-side damping coefficient and rear-side damping coefficient. In a damped vibration model of single-degree-of-freedom, the following relationships can be established:

$$\text{sprung-portion resonance frequency } \omega = (k/m)^{1/2} \quad (1)$$

$$\text{critical damping coefficient } C_C = 2 \cdot (m \cdot k)^{1/2} \quad (2)$$

$$\text{damping ratio } \zeta = C/C_C \quad (3)$$

where "m" represents mass of corresponding one of sprung portions (i.e., share load W divided by gravitational acceleration g), "C" represents damping coefficient of shock absorber, and "k" represents spring constant of suspension spring.

Further, an equation of motion in the damped vibration model of single-degree-of-freedom can be expressed as follows:

$$m \cdot d^2x(t)/dt^2 + C \cdot dx(t)/dt + k \cdot x(t) = 0 \quad (4)$$

where "x(t)" represents amount of displacement of each portion of sprung portion.

From solution of the equation of motion, it is possible to derive the following expressing representing damped vibration frequency $\omega_d$:

$$\omega_d = (1-\zeta^2)^{1/2} \cdot \omega \text{(where } \zeta 1) \quad (5)$$

It is noted that, in an ordinary vehicle, the damping ratio $\zeta$ is tuned such that vibration arisen upon passage of wheel over a protrusion or recess on a road surface settles down in a length of time that is slightly larger than one cycle of the vibration.

FIG. 1 shows a case in which the pitch vibration occurs in the vehicle body when the two front wheels and the two rear wheels pass over a protrusion on a road surface during a forward running of the vehicle, namely, when the two front wheels pass over the protrusion and then the two rear wheels pass over the protrusion. In this case, a damped vibration, whose frequency is represented by the above expression (5), is caused in each of the four sprung portions of the vehicle. Where the frequency of the damped vibration in front two of the four sprung portions (each of the front two sprung portions will be hereinafter simply referred to as "front-wheel-side portion" where appropriate) is substantially equal to the frequency of the damped vibration in rear two of the four sprung portions (each of the rear two sprung portions will be hereinafter simply referred to as "rear-wheel-side portion" where appropriate), an amount of displacement of the front-wheel-side portion and an amount of displacement of the rear-wheel-side portion are maximized sequentially in this order of description, and then the vibration in the front-wheel-side portion and the vibration in the rear-wheel-side portion settle down sequentially in this order of description, as shown in FIG. 2. It is considered that a pitch angle of the vehicle body can be made small by making the amount of the displacement of the front-wheel-side portion in a rebound direction and the amount of the displacement of the rear-wheel-side portion in the rebound direction be maximized concurrently with each other. Further, when the wheels pass over a recess on a road surface during a forward running of the vehicle, the pitch angle can be made small by making the amount of the displacement of the front-wheel-side portion in a bound direction and the amount of the displacement of the rear-wheel-side portion in the bound direction be maximized concurrently with each other. That is, the pitch angle can be made small by reducing the frequency of the damped vibration in the front-wheel-side portion so as to delay phase of the vibration in the front-wheel-side portion, and/or increasing the frequency of the damped vibration in the rear-wheel-side portion so as to advance phase of the vibration in the rear-wheel-side portion. As is understood from the above expressions (3) and (5), it is possible to change the damped vibration frequency $\omega_d$ by changing the damping coefficient C of the shock absorber. Thus, the pitch reduction state can be established by establishing the first state in which the front-side damping coefficient is larger than the rear-side damping coefficient. FIG. 2 shows a case in which the vehicle runs at a certain running speed. When the running speed is increased, initiation of the vibration in the front-wheel-side portion and initiation of the vibration in the rear-wheel-side portion become close to each other, so that a point of time at which the amount of the displacement of the front-wheel-side portion in the rebound direction is maximized and a point of time at which the amount of the displacement of the rear-wheel-side portion in the rebound direction is maximized become closer to each other. On the other hand, when the running speed is reduced, the point of time at which the amount of the displacement of the front-wheel-side portion in the rebound direction is maximized and the point of time at which the amount of the displacement of the rear-wheel-side portion in the rebound direction is maximized become more distant from each other.

There will be described a case in which the roll vibration occurs in the vehicle body when the front right or left wheel and the rear right or left wheel pass over a protrusion or recess on a road surface during a forward running of the vehicle, namely, when the front right and rear right wheels or the front left and rear left wheels sequentially pass over the protrusion or recess. For example, in a state in which the front left wheel has already passed over the protrusion and the rear left wheel is currently passing over the protrusion, as shown in FIG. 3A (that is a view of the front wheels as seen from a rear side of the vehicle) and FIG. 3B (that is a view of the rear wheels as seen from the rear side of the vehicle), a front left one of the four sprung portions (that corresponds to the front left wheel) is displaced in the rebound direction while a rear left one of the four sprung portions (that corresponds to the rear left wheel) is displaced in the bound direction. In this state, the front-wheel-side portion and rear-wheel-side portion are forced to be rolled in respective directions that are opposite to each other, so that the vehicle body as a whole is hard to be rolled owing to stiffness of the vehicle body. It is therefore considered possible to reduce roll of the vehicle body, by offsetting the point of time at which the amount of displacement of the front-wheel-side portion in the rebound direction is maximized and the point of time at which the amount of displacement of the rear-wheel-side portion in the rebound direction is maximized, from each other, such that the vibration in the front-wheel-side portion and the vibration in the rear-wheel-side portion are made opposite in phase to each other. Specifically, the roll of the vehicle body can be made small by increasing the frequency of the damped vibration in the front-wheel-side portion so as to advance phase of the vibration in the front-wheel-side portion, and/or reducing the frequency of the damped vibration in the rear-wheel-side portion so as to delay phase of the vibration in the rear-wheel-side portion. Thus, the roll reduction state can be established by establishing the second state in which the rear-side damping coefficient is larger than the front-side damping coefficient.

Normally, the above-described front-side damping coefficient (i.e., damping coefficient of each front-side shock absorber) and rear-side damping coefficient (i.e., damping coefficient of each front-side shock absorber) are set to be substantially equal to each other. However, a front-side resonance frequency as the resonance frequency of each of front two of the four sprung portions and a rear-side resonance frequency as the resonance frequency of each of rear two of the four sprung portions are made different from each other, for example, when a load acting on the front-wheel-side portion and a load acting on the rear-wheel-side portion are different from each other. In such a case, as is understood from the above expression (5), the frequency of the damped vibration in the front-wheel-side portion and the frequency of the damped vibration in the rear-wheel-side portion are made different from each other. Therefore, depending on a relationship between the frequency of the damped vibration in the front-wheel-side portion and the frequency of the damped vibration in the rear-wheel-side portion, namely, a relationship between the front-side resonance frequency and the rear-side resonance frequency, there could be a case in which the amount of displacement of the rear-wheel-side portion in the rebound direction is maximized before the amount of displacement of the front-wheel-side portion in the rebound direction is maximized, when the wheels pass over a protrusion on a road surface during a forward running of the vehicle.

In the following description, there will be used terms "front-wheel-side-portion maximum displacement time" and "rear-wheel-side-portion maximum displacement time". The "front-wheel-side-portion maximum displacement time" is defined as a length of time from a point of time at which the front wheels reach a protrusion on a road surface to a point of time at which an amount of displacement of the front-wheel-side portion in the rebound direction is maximized (see FIG. 2), or as a length of time from a point of time at which the front wheels reach a recess on a road surface to a point of time at which an amount of displacement of the front-wheel-side portion in the bound direction is maximized. The "rear-wheel-side-portion maximum displacement time" is defined as a length of time from the point of time at which the front wheels reach the protrusion to a point of time at which an amount of displacement of the rear-wheel-side portion in the rebound direction is maximized (see FIG. 2), or as a length of time from the point of time at which the front wheels reach the recess to a point of time at which an amount of displacement of the rear-wheel-side portion in the bound direction is maximized. In a case in which the front-wheel-side-portion maximum displacement time is shorter than the rear-wheel-side-portion maximum displacement time, as shown in FIG. 2, it is preferable that the above-described first state is established when the pitch reduction state is to be established, and that the above-described second state is established when the roll reduction state is to be established. On the other hand, in the above-described case (not shown in the drawings) in which the amount of displacement of the rear-wheel-side portion in the rebound direction is maximized before the amount of displacement of the front-wheel-side portion in the rebound direction is maximized, namely, in which the rear-wheel-side-portion maximum displacement time is shorter than the front-wheel-side-portion maximum displacement time, it is preferable that the above-described second state is established when the pitch reduction state is to be established, and that the above-described first state is established when the roll reduction state is to be established.

In the suspension system according to this mode (13), the damping coefficients of the respective four shock absorbers can be controlled by the control unit, for establishing a selected one of the pitch reduction state and the roll reduction state, such that a damping coefficient ratio (i.e., ratio between the front-side damping coefficient and the rear-side damping coefficient) is set to a predetermined ratio that is predetermined for the selected one of the pitch reduction state and the roll reduction state. In general, the damping coefficient of the shock absorber is changeable by the damping coefficient changer only in a limited range, and accordingly it is preferable to increase a difference between the front-side damping coefficient and the rear-side damping coefficient such that a difference between the rear-wheel-side-portion maximum displacement time and the front-wheel-side-portion maximum displacement time is eliminated. Described specifically, irrespective of whether the pitch reduction state or the roll reduction state is to be established, it is preferable to set the damping coefficient ratio such that a larger one of the front-side damping coefficient and rear-side damping coefficient is at least twice as large as a smaller one of the front-side damping coefficient and rear-side damping coefficient.

(14) The suspension system according to mode (13),
wherein the control unit is configured to establish, as the pitch reduction state, one of the first and second states that is predetermined based on a relationship between a front-side resonance frequency as the resonance frequency of each of front two of the four sprung portions that correspond to the front wheels and a rear-side resonance frequency as the resonance frequency of each of rear two of the four sprung portions that correspond to the rear wheels,
and wherein the control unit is configured to establish, as the roll reduction state, the other of the first and second states that is predetermined based on the relationship between the front-side resonance frequency and the rear-side resonance frequency.

(15) The suspension system according to mode (13) or (14),
wherein the control unit is configured to establish, as the pitch reduction state, a selected one of the first and second states that is selected depending on a front-wheel-side-portion maximum displacement time and a rear-wheel-side-portion maximum displacement time during a forward running of the vehicle over a protrusion or a recess on a road surface, such that the first state and the second state are established as the pitch reduction state and the roll reduction state, respectively, where the front-wheel-side-portion maximum displacement time is shorter than the rear-wheel-side-portion maximum displacement time, and such that the first state and the second state are established as the roll reduction state and the pitch reduction state, respectively, where the rear-wheel-side-portion maximum displacement time is shorter than the front-wheel-side-portion maximum displacement time,
where the front-wheel-side-portion maximum displacement time is defined as a length of time from a point of time at which the front wheels reach the protrusion to a point of time at which an amount of displacement of front two of the four sprung portions that correspond to the front wheels in a rebound direction (i.e., downward direction) is maximized, or as a length of time from a point of time at which the front wheels reach the recess to a point of time at which an amount of displacement of the front two of the four sprung portions in a bound direction (i.e., upward direction) is maximized, and
the rear-wheel-side-portion maximum displacement time is defined as a length of time from the point of time at which the front wheels reach the protrusion to a point of time at which an amount of displacement of rear two of the four sprung portions that correspond to the rear wheels in the rebound direction is maximized, or as a length of time from the point of time at which the front wheels reach the recess to a point of time at which an amount of displacement of the rear two of the four sprung portions in the bound direction is maximized.

Each of the above modes (14) and (15) is a mode specifying how it is determined which one of the first and second states corresponds to the pitch reduction state and which one of the first and second states corresponds to the roll reduction state.

(16) The suspension system according to any one of modes (13)-(15),
wherein the control unit is configured to be capable of executing, as the plurality of vibration damping controls, at least a roll-vibration damping control and a pitch-vibration damping control that are to be executed for damping roll and pitch vibrations, respectively, as the plurality of vehicle-body vibrations, and wherein the control unit is configured, when at least one of the roll and pitch vibrations is required to be damped in the low vibration intensity situation, to establish the roll reduction state by controlling the damping coefficient of each of the four hydraulic shock absorbers while not executing the roll-vibration damping control, or to establish the pitch reduction state by controlling the damping coefficient of each of the four hydraulic shock absorbers while not executing the pitch-vibration damping control.

(17) The suspension system according to mode (16),
wherein the control unit is configured, when an intensity of the roll vibration is higher than a threshold intensity degree while an intensity of the pitch vibration is not higher than a threshold intensity degree in the low vibration intensity situation, to establish the roll reduction state by controlling the damping coefficient of each of the four hydraulic shock absorbers while not executing the roll-vibration damping control and the pitch-vibration damping control,
and wherein the control unit is configured, when the intensity of the roll vibration is not higher than the threshold intensity degree while the intensity of the pitch vibration is higher than the threshold intensity degree in the low vibration intensity situation, to establish the pitch reduction state by controlling the damping coefficient of each of the four hydraulic shock absorbers while not executing the roll-vibration damping control and the pitch-vibration damping control.

(18) The suspension system according to mode (16) or (17), wherein the control unit is configured, when an intensity of the roll vibration and an intensity of the pitch vibration are higher than respective threshold intensity degrees in the low vibration intensity situation, to establish the roll reduction state by controlling the damping coefficient of each of the four hydraulic shock absorbers while executing the pitch-vibration damping control without executing the roll-vibration damping control, or to establish the pitch reduction state by controlling the damping coefficient of each of the four hydraulic shock absorbers while executing the roll-vibration damping control without executing the pitch-vibration damping control.

In the suspension system according to each of the above modes (16)-(18), the roll vibration or the pitch vibration can be restrained or reduced by the shock absorber, whereby generation of the displacement force by each displacement force generator can be further limited. In the suspension system according to mode (17), one of the roll vibration and the pitch vibration is damped by the shock absorbers, when it is judged based on the intensities of the roll vibration and the pitch vibration that the above-described one of the roll vibration and the pitch vibration is to be damped. In the suspension system according to mode (18), one of the roll vibration and the pitch vibration is damped by the shock absorbers while the other of the roll vibration and the pitch vibration is damped by the displacement force generators, when it is judged based on the intensities of the roll vibration and the pitch vibration that both of the roll vibration and the pitch vibration are to be damped.

(21) The suspension system according to any one of modes (1)-(9) and (11)-(18), wherein each of the four displacement force generators, which is configured to generate the displacement force forcing a corresponding one of the four sprung portions and a corresponding one of the four unsprung portions toward or away from each other, includes (a-1) an elastic body connected at one of opposite end portions thereof to one of the corresponding sprung portion and the corresponding unsprung portion, and (a-2) an electromagnetic actuator which is disposed between the other of the opposite end portions of the elastic body and the other of the corresponding sprung portion and the corresponding unsprung portion and which interconnects the elastic body and the other of the corresponding sprung portion and the corresponding unsprung portion, and wherein the electromagnetic actuator includes the electromagnetic motor, and is configured to generate an actuator force based on the motor force generated by the electromagnetic motor, such that the generated actuator force acts on the elastic body so as to change an amount of deformation of the elastic body that is dependent on an amount of actuation of the actuator, and such that the generated actuator force is transmitted to the corresponding sprung portion and the corresponding unsprung portion via the elastic body so as to act as the displacement force.

In the suspension system according to this mode (21), the displacement force generators are provided by a stabilizer of right/left independent type. Each of the "displacement force generators" recited in this mode (21) is configured to cause the actuator force (generated by the actuator) to act on the elastic body so as to change the amount of deformation of the elastic body that is dependent on the amount of actuation of the actuator. Thus, in the system according to this mode (21), the amount of the displacement force generated by the displacement force generator is dependent on the amount of actuation of the actuator. The "elastic body" recited in this mode (21) may be provided by any one of various forms of elastic bodies such as coil spring and torsion spring, as long as it is capable of exhibiting an elastic force that is dependent on an amount of its deformation.

(22) The suspension system according to mode (21), wherein the elastic body includes (a-1-i) a shaft portion which is rotatably held by the corresponding sprung portion and (a-1-ii) an arm portion which extends from one of opposite end portions of the shaft portion in a direction intersecting the shaft portion and which is connected at a distal end portion thereof to the corresponding unsprung portion, and wherein the actuator is fixed to a body of the vehicle, and is configured to rotate the shaft portion about an axis of the shaft portion by the actuator force generated by the actuator.

In this mode (22), the construction of the displacement force generator is more specified. The "elastic body" recited in this mode (22) includes the shaft portion and the arm portion, at least one of which has a function serving as the elastic body. For example, the shaft portion may be arranged to be twisted so as to serves as a spring, and/or the arm portion may be arranged to be deflected so as to serve as a spring. It is noted that the elastic body may be constituted by either an assembly of the shaft and arm portions provided by respective members that are connected to each other, or a single piece including the shaft and arm portions that are provided by a single member.

(23) The suspension system according to mode (21) or (22), wherein the actuator is configured to have a positive/negative efficiency product that is not larger than 1/2, where the positive/negative efficiency product is defined as a product of a positive efficiency of the actuator and a negative efficiency of the actuator, the positive efficiency is defined as a ratio of an amount of an external force acting on the actuator, to an amount of the motor force minimally required to cause the actuation of the actuator against the external force, and the negative efficiency is defined as a ratio of an amount of the motor force minimally required to inhibit the actuator from being actuated by an external force acting on the actuator, to an amount of the external force.

The "positive/negative efficiency product" described in the present mode may be considered as a ratio of an amount of the motor force minimally required to inhibit the actuator from being actuated by a certain amount of the external force acting on the actuator, to an amount of the motor force minimally required to cause the actuation of the actuator against the external force. Thus, a low value of the positive/negative efficiency product indicates that the actuator is hard to be actuated by the external force. Where the positive/negative efficiency product of the actuator is relatively low, the electromagnetic motor requires a relatively small amount of electric power for maintaining a wheel-body distance (i.e., a vertical distance between the sprung and unsprung portions) under application of the external force to the actuator, for restraining roll and pitch of the vehicle body. Therefore, the system according to this mode (23) is a suspension system that is advantageous from a point of view of electric power saving.

(24) The suspension system according to any one of modes (21)-(23), wherein the actuator includes a speed reducer configured to decelerate motion that is inputted from the electromagnetic motor, and is configured to output the decelerated motion as the actuation of the actuator, and wherein the speed reducer has a reduction gear ratio that is not higher than 1/100.

In the system according to this mode (24), the reduction gear ratio, i.e., a ratio of an actuation amount of the actuator to a motion amount of the electromagnetic motor is relatively low. It can be considered that the above-described positive/ negative efficiency product is, in general, reduced by employing the speed reducer having a low reduction gear ratio. In view of this, the system of this mode (24) can be considered as a kind of the system in which the actuator having a relatively low positive/negative efficiency product is employed. The employment of the speed reducer having the low reduction gear ratio permits the electromagnetic motor to be made compact in size. The "speed reducer" recited in this mode (24) may have a construction that is not particularly limited. For example, it is possible to employ, as the speed reducer, any one of various kinds of speed reducers such as a harmonic gear set (that is also called "harmonic drive" or "strain wave gearing") and a hypocycloid gear set.

BRIEF DESCRIPTION OF DRAWINGS

The above and other objects, features, advantages and technical and industrial significance of the present invention will be better understood by reading the following detailed description of presently preferred embodiment of the invention, when considered in connection with the accompanying drawings, in which:

FIGS. 3A and 3B are a set of views schematically showing a state in which a front left wheel of the vehicle has already passed over a protrusion on a road surface and a rear left wheel of the vehicle is currently passing over the protrusion, wherein FIG. 3A is a view of front wheels of the vehicle as seen from a rear side of the vehicle while FIG. 3B is a view of rear wheels of the vehicle as seen from a rear side of the vehicle;

FIGS. 20A and 20B are a set of views showing a modification of the embodiment in which each of vibration damping controls is executed depending on an intensity of a corresponding one of bounce vibration, roll vibration and pitch vibration.

BEST MODE FOR CARRYING OUT THE INVENTION

There will be described an embodiment of the present invention, by reference to the accompanying drawings. It is to be understood that the present invention is not limited to the following embodiment, and may be otherwise embodied with various changes and modifications, such as those described in the foregoing "MODES OF THE INVENTION", which may occur to those skilled in the art.

<Construction of Suspension System>

(i) Overall Construction of Suspension System

Figure 1:
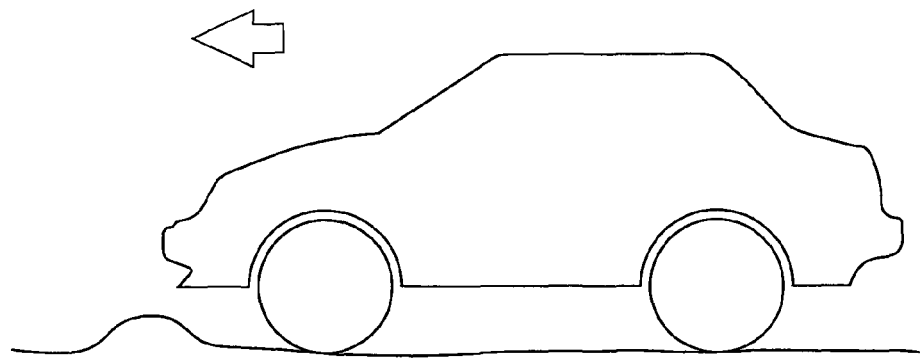
FIG. 1 is a view schematically showing, as an example of case of occurrence of pitch vibration, a case in which front and rear wheels pass over a protrusion on a road surface during a forward running of the vehicle.
Figure 2:
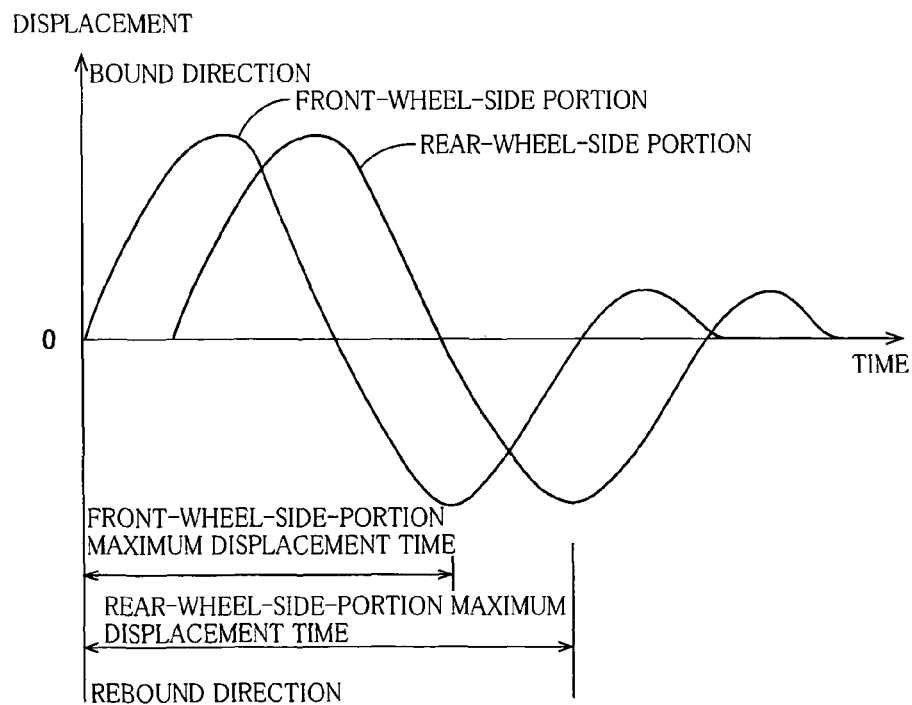
FIG. 2 is a graph showing displacements of a front-wheel-side portion and a rear-wheel-side portion of a body of the vehicle in the case shown in FIG. 1.
Figure 3A:
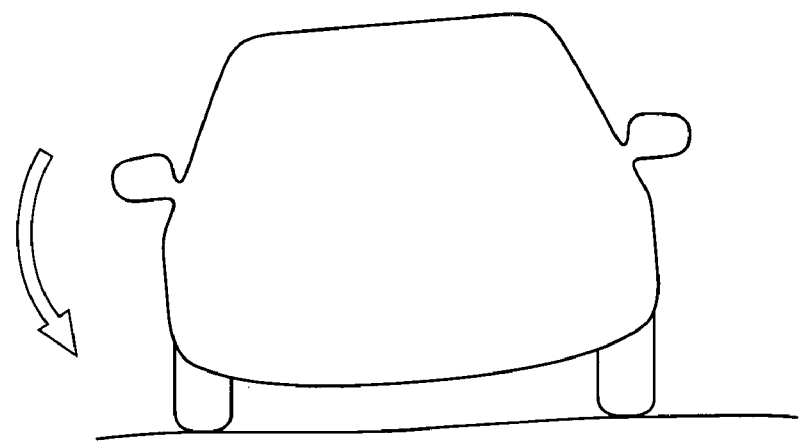
Figure 3B:
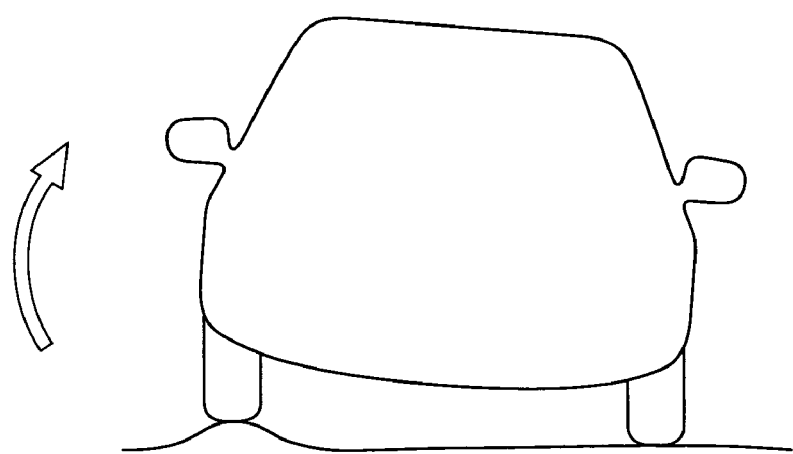
Figure 4:
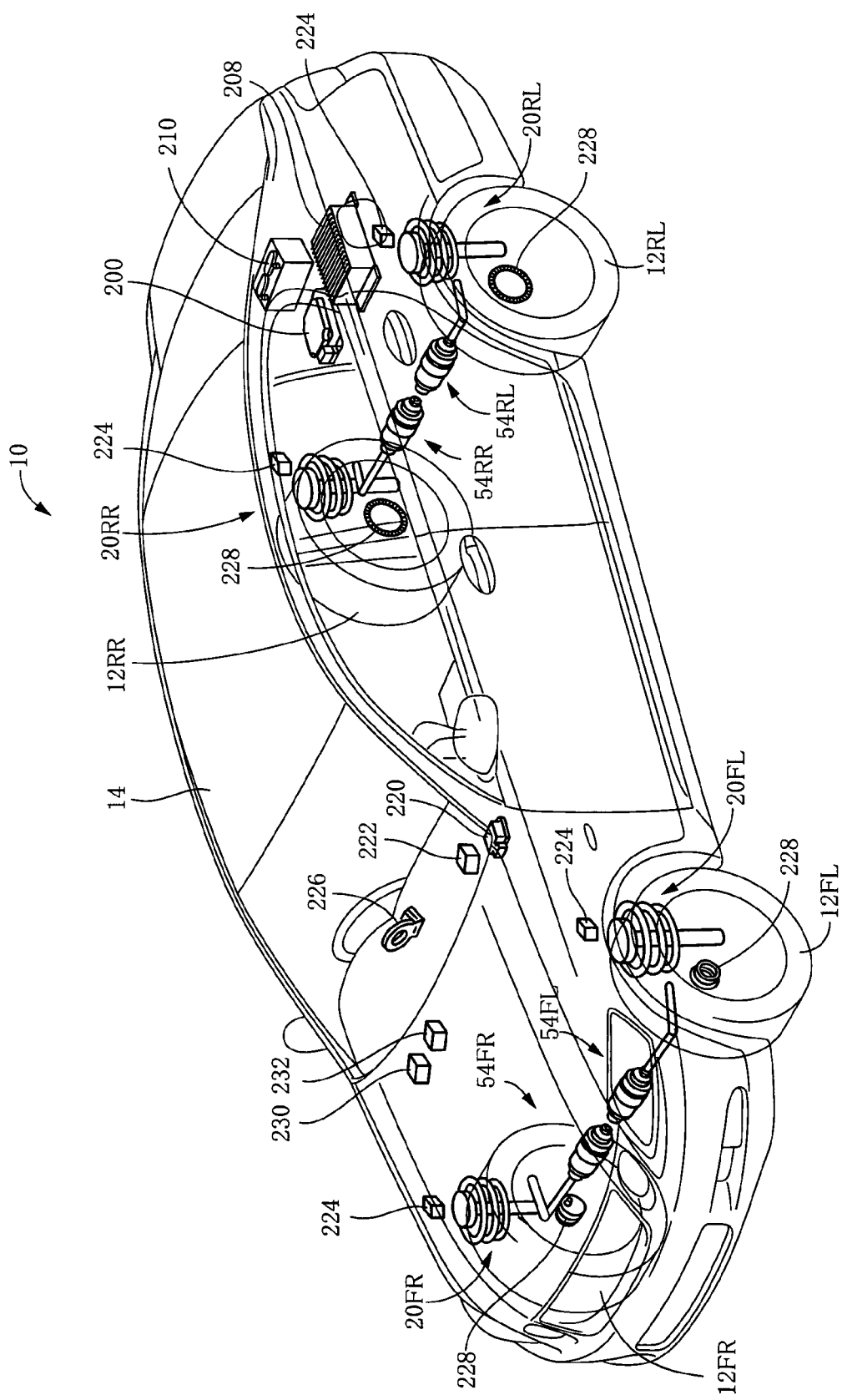
FIG. 4 is a view schematically showing an overall construction of a vehicle suspension system which is constructed according to an embodiment of the invention.
Figure 5:
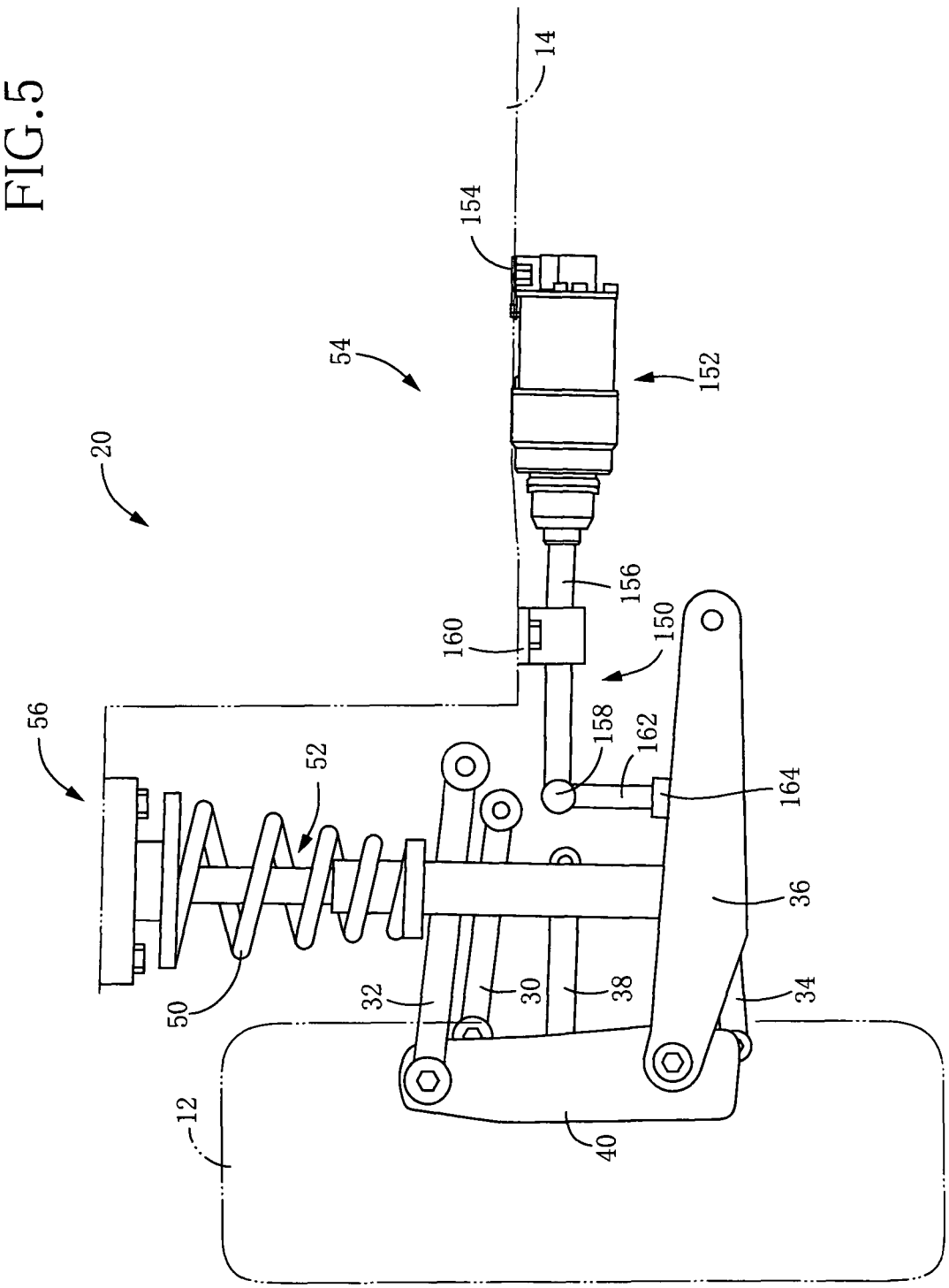
FIG. 5 is a view of a suspension device provided in the suspension system of FIG. 4, as seen from a rear side of the vehicle.
Figure 6:
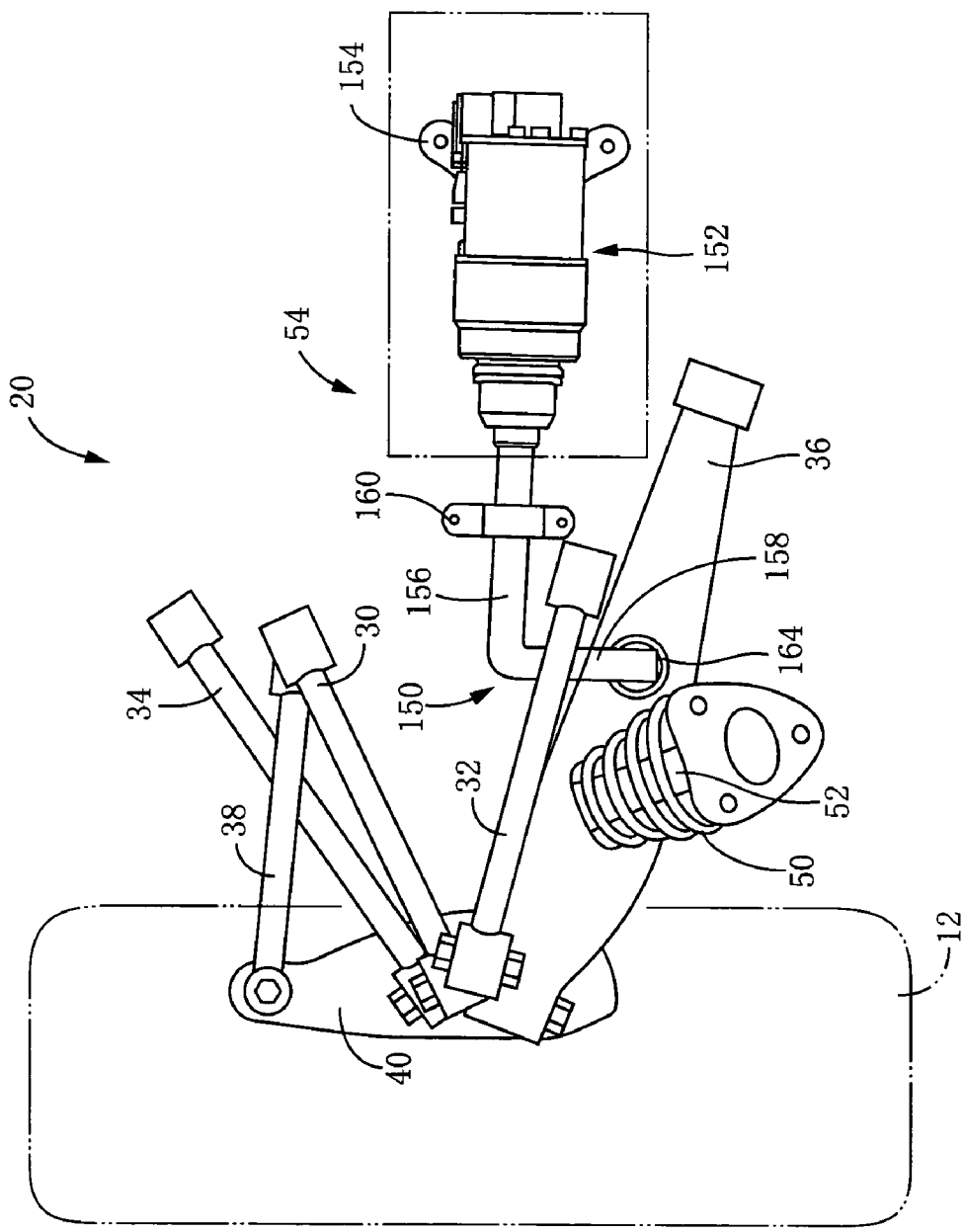
FIG. 6 is a view of the suspension device provided in the suspension system of FIG. 4, as seen from an upper side of the vehicle.

FIG. 4 schematically shows a suspension system 10 for a vehicle, which is constructed according to an embodiment of the invention. The suspension system 10 includes four suspension devices 20FR, 20FL, 20RR, 20RL which are provided for a front right wheel 12FR, a front left wheel 12FL, a rear right wheel 12RR and a rear left wheel 12RL of the vehicle, respectively. Each of the four suspension devices 20 is disposed between a body 14 of the vehicle and a corresponding one of the four wheels 12. The suspension devices 20FR, 20FL provided for the front wheels 12FR, 12FL as steered wheels are equipped with mechanisms for allowing the wheels 12FR, 12FL to be steered, while the suspension devices 20RR, 20RL provided for the rear wheels 12RR, 12RL as non-steered wheels are not equipped with such steering mechanism. However, since all the suspension devices 20 can be regarded to be identical in construction with one another except for presence or absence of the steering mechanism, there will be described, as a representative of the four suspension devices 20, the suspension device 20RL that is provided for the rear left wheel 12RL, in the interest of simplification of the description. FIG. 5 is a side view of the suspension device 20RL as seen from a rear side of the vehicle. FIG. 6 is a plan view of the suspension device 20RL as seen from an upper side of the vehicle. In the following description, each of the suspension devices 20 will be referred together with, as a suffix, one of reference signs FR, FL, RR, RL indicative of the respective front right, front left, rear right and rear left wheels, where it should be clarified which one of the four wheels the referred suspension devices 20 corresponds to. Similarly, each value such as damping coefficient and resonance frequency will be referred together with, as a suffix, one of reference signs Fr, Rr indicative of respective front-wheel side portion and rear-wheel side portion, where it should be clarified which one of the front-wheel side portion and rear-wheel side portion the referred value corresponds to.

As shown in FIGS. 5 and 6, the suspension device 20 of independent type is provided by a multi-link suspension, and is equipped with an arm assembly as a wheel holder that includes a total of five suspension arms, i.e., a first upper arm 30, a second upper arm 32, a first lower arm 34, a second lower arm 36 and a toe control arm 38. Each of the five suspension arms 30, 32, 34, 36, 38 is connected at one of its longitudinal end portions to the vehicle body 14, pivotably relative to the vehicle body 14, and is connected at the other longitudinal end portion to an axle carrier 40 by which the wheel 12 is relatively rotatably held. Owing to its connection with the five suspension arms 30, 32, 34, 36, 38, the axle carrier 40 is vertically displaceable relative to the vehicle body 14 along a predetermined locus.

The suspension device 20 includes a coil spring 50 as a suspension spring, a hydraulic shock absorber 52 and a wheel-body distance adjuster device 54 that is capable of adjusting a vertical distance between the vehicle body 14 and a corresponding one of the wheels 12 of the vehicle. The coil spring 50, shock absorber 52 and adjuster device 54 are arranged in parallel to each other between a part of the vehicle body 14 and the second lower arm 36 that constitutes a part of an unsprung portion, wherein the part of the vehicle body 14 includes a mount portion 56 that constitutes a part of a sprung portion.

(ii) Construction of Shock Absorber

Figure 7:
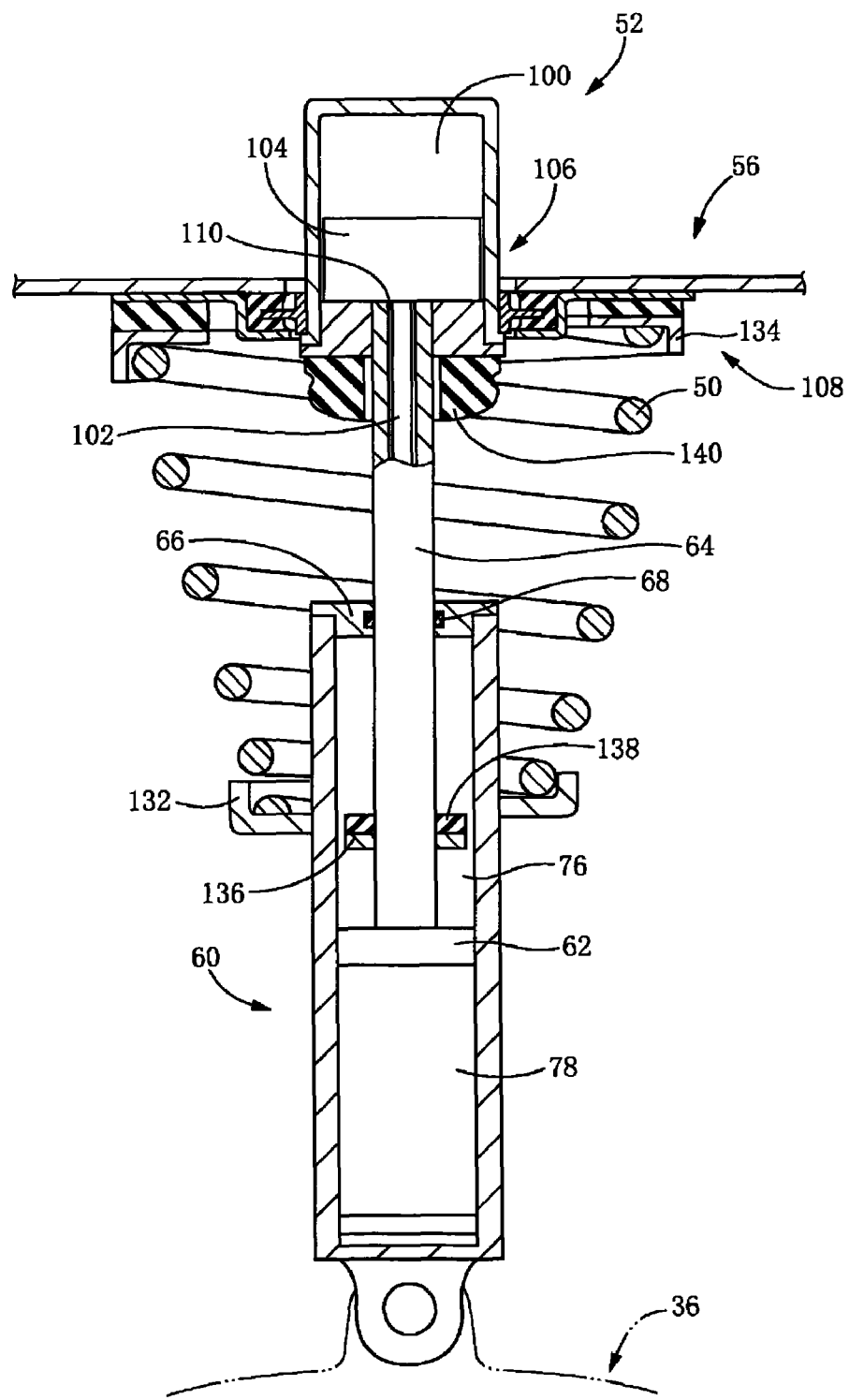
FIG. 7 is a view, partially in cross section, showing a shock absorber that is included in the suspension device of FIG. 5.
Figure 8:
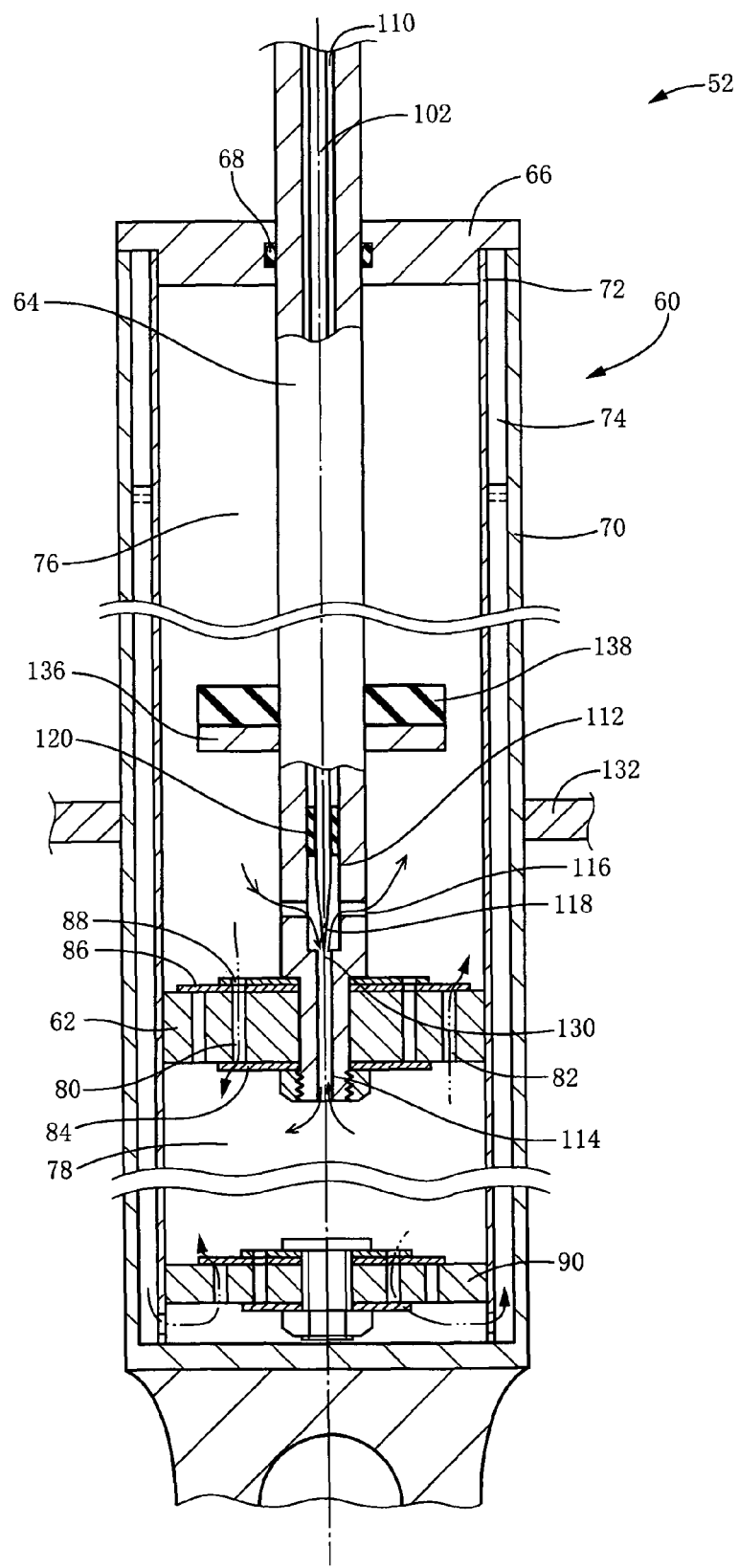
FIG. 8 is a view showing a part of the shock absorber of FIG. 7, wherein flow of a working fluid upon downward displacement of a piston is shown in a right side of an axis of the shock absorber while flow of the working fluid upon upward displacement of the piston is shown in a left side of the axis of the shock absorber.

Referring next to FIGS. 7 and 8, the shock absorber 52 will be described in detail. As shown in FIG. 7, the shock absorber 52 includes a housing 60 which stores therein a working fluid, a piston 62 which is fluid-tightly and slidably fitted in the housing 60, and a piston rod 64 which is connected at its lower end portion to the piston 62 and which protrudes upwardly from the housing 60. The housing 60 is connected at its lower end portion to the second lower arm 36, while the piston rod 64 is connected at its upper end portion to the mount portion 56. The piston rod 64 extends through a cap portion 66 that is disposed in an upper end portion of the housing 60, and is held in slidable contact with the cap portion 60 via an annular seal 68.

As shown in FIG. 8, the housing 60 includes an outer cylinder 70 and an inner cylinder 72 such that a buffer chamber 74 is defined between the outer and inner cylinders 71, 72. The piston 62 is fluid-tightly and slidably fitted in an inner circumferential surface of the inner cylinder 72, and an inside space of the inner cylinder 72 is divided by the piston 62 into an upper chamber 76 and a lower chamber 78. The piston 62 has a plurality of communication passages 80, 82 which allow communication between the upper and lower chambers 76, 78 therethrough. FIG. 8 illustrates two of the communication passages 80 and two of the communication passages 82. The communication passages 80 are arranged on a circle while the communication passages 82 are arranged on another circle, such that the two circles are coaxial with each other. A lower valve plate 84, which is provided by a circular-shaped elastic member, is disposed on a lower surface of the piston 62, such that the communication passages 80 (located on a radially inner side of the communication passages 82) are normally closed by the lower valve plate 84. When the lower valve plate 84 is deflected owing to a difference between a fluid pressure in the upper chamber 76 and a fluid pressure in the lower chamber 78, the working fluid is allowed to flow from the upper chamber 76 to the lower chamber 78. On the other hand, two upper valve plates 86, 88, each of which is provided by a circular-shaped elastic member, are disposed on an upper surface of the piston 62, such that the communication passages 82 (located on a radially outer side of the communication passages 80) are normally closed by the upper valve plate 86. When the upper valve plate 86 is deflected owing to a difference between the fluid pressure in the upper chamber 76 and the fluid pressure in the lower chamber 78, the working fluid is allowed to flow from the lower chamber 78 to the upper chamber 76. It is noted that the communication passages 80 (located on the radially inner side of the communication passages 82) are not closed by the two upper valve plates 86, 88 but are always held in communication with the upper chamber 76 via through-holes formed through the upper valve plates 86, 88. Further, between the lower chamber 76 and the buffer chamber 74, there is disposed a base valve body 90, which is provided with communication passages and valve plates, as the piston 62.

As shown in FIG. 7, the shock absorber 62 includes an electromagnetic motor 100 of rotary-type, an adjusting rod 102 movable in its axial direction, and a motion converter 104 configured to convert a rotary motion of the motor 100 into a linear motion. The motor 100 is fixedly accommodated in a motor casing 106, which is connected at its outer peripheral portion to the mount portion 56 via an upper support 108 that includes a rubber vibration insulator. The piston rod 64 is fixedly connected at its upper end portion to the motor casing 106, so as to be connected to the mount portion 56 via the motor casing 106. The adjusting rod 102 is received in a through-hole 110 formed through the piston rod 64 and extending in an axial direction of the piston rod 64, and is movable in the axial direction. The adjusting rod 102 is connected at its upper end portion to the motor 100 via the motion converter 104, and is movable in the axial direction by rotation of the motor 100.

As shown in FIG. 8, the through-hole 110 is a stepped hole, and has a large diameter portion 112 and a small diameter portion 114 that are provided by its upper and lower portions, respectively. The large diameter portion 112 is held in communication with the upper chamber 76 through communication passages 116, while the small diameter portion 114 is held in communication with the lower chamber 78, so that the upper and lower chambers 76, 78 are held in communication with each other via the communication passages 116 and the through-hole 110. The adjusting rod 102 includes a lower end portion 108 that is tapered and other portion that is not tapered. An outside diameter of the other portion has an outside diameter that is smaller than an inside diameter of the large diameter portion 112 and is larger than an inside diameter of the small diameter portion 114. An outside diameter of the tapered lower end portion 108 is gradually reduced as the lower end portion 108 extends downwardly, so that the lower end portion 108 is at least partially introducible into the small diameter portion 114. A seal member 120 is provided on an upper side of a portion of the through-hole 110 at which the through-hole 110 is connected to the communication passages 116, such that a fluid tightness between the inner circumferential surface of the through-hole 110 and the outer circumferential surface of the adjusting rod 102 is established by the seal member 120.

In the shock absorber 52 constructed as described above, the fluid pressure in the upper chamber 76 is increased, for example, when the mount portion 56 and the second lower arm 36 are displaced away from each other, namely, when the piston 62 is upwardly displaced relative to the housing 60. When the fluid pressure in the upper chamber 76 is increased, a part of the working fluid in the upper chamber 76 flows into the lower chamber 78 via the communication passages 80 and the through-hole 110, and a part of the working fluid in the buffer chamber 74 flows into the lower chamber 78 via the communication passages of the base valve body 90. On the other hand, the fluid pressure in the lower chamber 78 is increased, for example, when the mount portion 56 and the second lower arm 36 are displaced toward each other, namely, when the piston 62 is downwardly displaced relative to the housing 60. When the fluid pressure in the lower chamber 78 is increased, a part of the working fluid in the lower chamber 78 flows into the upper chamber 76 via the communication passages 82 and the through-hole 110, and also into the buffer chamber 74 via the communication passages of the base valve body 90. A resistance is applied to the working fluid flowing through the through-hole 110, communication passages 80, 82 and communication passages of the base valve body 90, so that a resistance is applied against the relative movement of the piston 62 and the housing 60. That is, the shock absorber 52 is configured to generate a damping force acting against displacement of the sprung and unsprung portions toward or away from each other.

The adjusting rod 102 is movable in the axial direction by driving the motor 100, as described above. The lower end portion 118 of the adjusting rod 102 has an outer circumferential surface that cooperates with a stepped portion between the large diameter portion 112 and the small diameter portion 114 of the through-hole 110, to define therebetween an annular clearance 130. An area of the clearance 130, i.e., an opening area of the small diameter portion 114 is changed as the adjusting rod 102 is moved in the axial direction, so that a resistance applied from the through-hole 110 to the flow of the working fluid through the through-hole 110 is changeable by changing a position of the adjusting rod 102 relative to the piston rod 64. It is therefore possible to change a damping coefficient of the shock absorber 52, i.e., a damping characteristic against displacement of the sprung and unsprung portions toward or away from each other, by changing the area of the clearance 130, namely, by driving the motor 100 for moving the adjusting rod 102 in the axial direction. Thus, the shock absorber 52 is constructed to include a damping coefficient changer that is constituted by cooperation of the motor 100, adjusting rod 102, through-hole 110 and communication passages 116.

The motor 100 is a stepping motor that is configured to be stopped in a selected one of a plurality of predetermined angular positions (rotational angles). The shock absorber 52 is capable of changing its damping coefficient in a stepwise manner, depending on the selected angular position of the motor 100. Described specifically, the damping coefficient of the shock absorber 52 can be set to a selected one of three levels, i.e., a standard damping level $C_M$, a high damping level $C_H$ that is higher than the standard damping level $C_M$ and a low damping level $C_L$ that is lower than the standard damping level $C_M$.

As shown in FIG. 7, a lower retainer 132 having an annular shape is mounted on an outer peripheral portion of the housing 60, while the upper support 108 includes an upper retainer 134. The coil spring 50 is interposed between the lower and upper retainers 132, 134 so as to be supported by the retainers 132, 134. An annular member 136 is fixedly mounted on an outer circumferential surface of a portion of the piston rod 244 which is accommodated in the upper chamber 76. An annular cushion rubber 138 is bonded onto an upper surface of the annular member 136, so that relative displacement of the sprung and unsprung portions away from each other is limited by contact of the annular member 136 with a lower surface of the cap portion 66 via the cushion rubber 138. A tubular cushion rubber 140 is bonded onto a lower surface of the motor casing 106, so that relative displacement of the sprung and unsprung portions toward each other is limited by contact of the lower surface of the motor casing 106 with an upper surface of the cap portion 66 via the cushion rubber 140. That is, the shock absorber 52 has a bound stopper and a rebound stopper, i.e., stoppers against the relative displacement of the vehicle body and the wheel toward and away from each other.

(iii) Construction of Wheel-Body Distance Adjuster Device

The adjuster device 54 includes a L-shaped bar 150 having a generally L shape and an actuator 152 configured to rotate the L-shaped bar 150. The actuator 152 is fixed through an attachment 154 (that is provided in an end portion of the actuator 152) to a lower portion of the vehicle body 14. As shown in FIGS. 5 and 6, the L-shaped bar 150 includes a shaft portion 156 which extends substantially in a width or lateral direction of the vehicle, and an arm portion 158 which is contiguous to the shaft portion 156 and which extends in a direction not parallel to the shaft portion 156, e.g., substantially in a rearward direction of the vehicle. The shaft portion 156 of the L-shaped bar 150 is connected, at one of its longitudinal end portions (that is remote from the arm portion 158), to the actuator 152. The shaft portion 156 is held, at its longitudinally intermediate portion, by a retainer 160 that is fixed to the vehicle body 14, such that the shaft portion 156 is rotatable about its axis. Meanwhile, the arm portion 158 is connected at one of its longitudinal end portions (that is remote from the shaft portion 156) to the second lower arm 36 via a link rod 162. A link-rod connection portion 164 is provided on the second lower arm 36, so that the link rod 162 is rockably connected at its longitudinally opposite end portions to the link-rod connection portion 164 and the arm portion 158 of the L-shaped bar 150, respectively.

Figure 9:
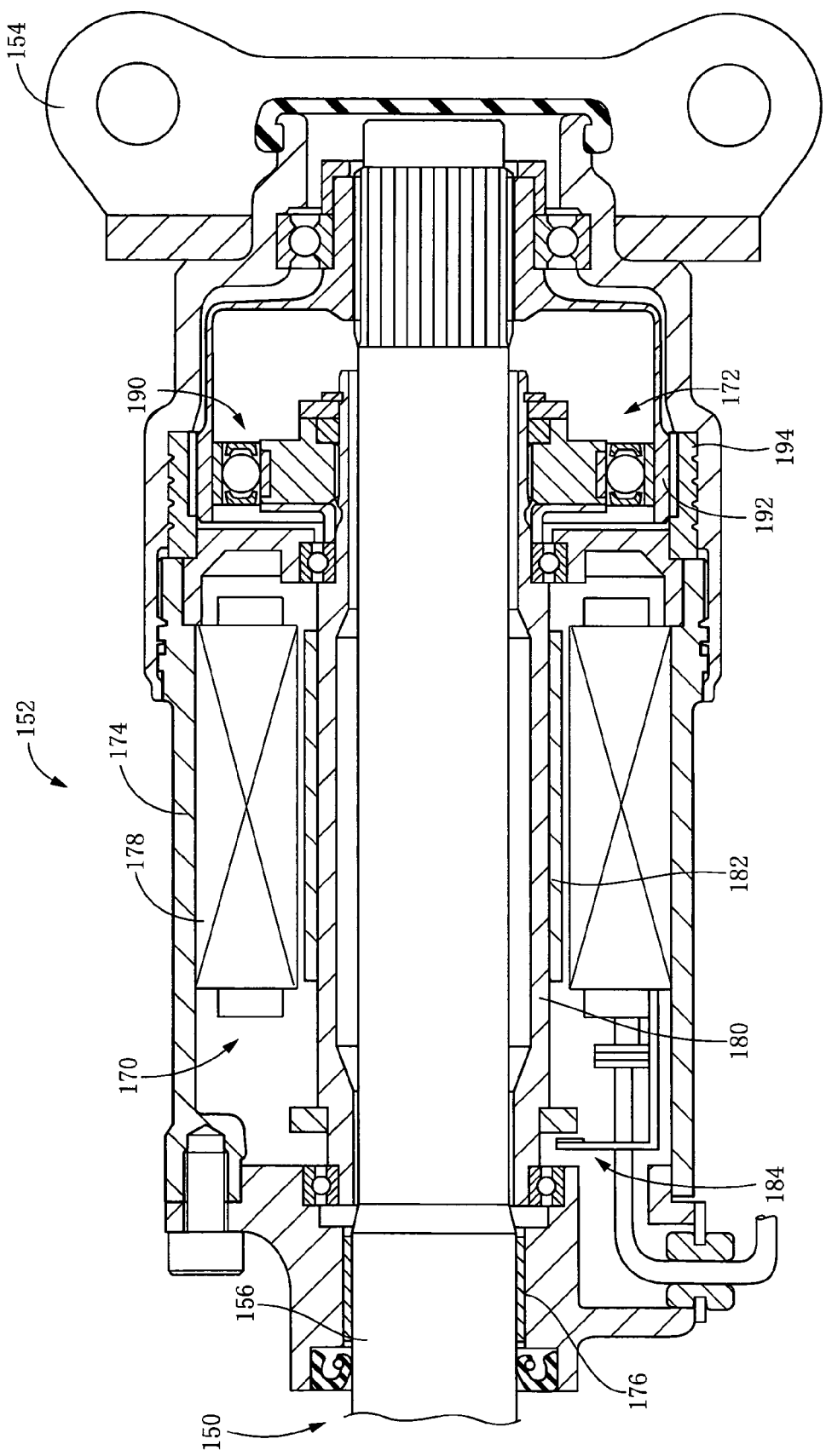
FIG. 9 is a view, partially in cross section, showing an actuator as a component of a wheel-body distance adjuster device that is included in the suspension device of FIG. 5.

As shown in FIG. 9, the actuator 152 of the adjuster device 54 includes an electromagnetic motor 170 as a drive source and a speed reducer 172 configured to transmit a rotational motion that is inputted from the motor 170 while reducing speed of the rotational motion. The motor 170 and the speed reducer 172 are disposed within a housing 174 as an outer shell member of the actuator 152. The housing 174 is fixedly attached to the vehicle body 14 through the above-described attachment 154 that is fixed to an end portion of the housing 174. The L-shaped bar 150 is arranged to extend throughout the housing 174 and project out from another end portion of the housing 174. The shaft portion 156 of the L-shaped bar 150 is connected, at its portion that is located within the housing 174, to the speed reducer 172. A bearing bushing 176 is provided to support an axially intermediate portion of the shaft portion 156 of the L-shaped bar 122, so that the shaft portion 156 is rotatably held by the housing 174 through the bearing bushing 176.

The motor 80 includes a plurality of coils 178 that are fixedly disposed on an inner circumferential surface of the housing 174, a motor shaft 180 that is provided by a hollow member rotatably held by the housing 174, and a permanent magnet 182 which is fixed to an outer circumferential surface of the motor shaft 180 and which is radially opposed to the coils 178. The motor 80 is provided by a three-phase DC brushless motor, so that each of the coils 178 serves as a stator while the permanent magnet 182 serves as a rotor. A motor rotational angle sensor 184 is provided in the housing 174, so as to detect a rotational angle (angular position) of the motor shaft 180, i.e., a rotational angle (angular position) of the motor 170. The rotational angle sensor 184 is constituted principally by a rotary encoder, and outputs a signal that is used in controlling the actuator 152, namely, controlling the adjuster device 54.

The speed reducer 172 is provided by a harmonic gear set (which is also called "harmonic drive (trademark)" or "strain wave gearing"), and includes a wave generator 190, a flexible gear (flexspline) 192 and a ring gear (circular spline) 194. The wave generator 190 includes an elliptic cam and a ball bearing fitted on an outer circumferential surface of the elliptic cam, and is fixed to an end portion of the motor shaft 180. The flexible gear 192 is provided by a cup-shaped member having a circumferential wall portion that is elastically deformable, and a plurality of teeth (e.g., a total of 400 teeth in the present embodiment) formed on its outer circumferential surface. The teeth are located in one of axially opposite end portions of the flexible gear 192 that is close to an opening end of the cup-shaped flexible gear 192. The flexible gear 192 is connected to a gear connection portion of the shaft portion 156 of the L-shaped bar 150, so as to be held by the shaft portion 156. Described more specifically, the shaft portion 156 of the L-shaped bar 150 is arranged to extend throughout the motor shaft 180 provided by the hollow member. The above-described gear connection portion of the shaft portion 156 projects out from the motor shaft 180, and extends through a hole formed through a bottom wall of the cup-shaped flexible gear 192. The gear connection portion of the shaft portion 156 is serrated on its outer circumferential surface so as to be held in engagement with an inner circumferential surface of the hole formed through the bottom wall of the cup-shaped flexible gear 192 that is also serrated. Owing to the serration engagement (spline engagement), the shaft portion 156 and the flexible gear 192 are connected to each other, and are unrotatable relative to each other. The ring gear 194 is provided by a ring member fixed to the housing 174, and has a plurality of teeth (e.g., a total of 402 teeth in the present embodiment) formed on its inner circumferential surface. The flexible gear 192 is fitted at its circumferential wall portion on the wave generator 190, and is elastically deformed to have an elliptic shape. The flexible gear 192 meshes, at two portions thereof that lie substantially on a long axis of the elliptic shape, with the ring gear 194, while not meshing at the other portions thereof with the ring gear 194.

In the speed reducer 172 constructed as described above, while the wave generator 190 is rotated by one rotation (by 360°), namely, while the motor shaft 180 of the motor 170 is rotated by one rotation, the flexible gear 192 and the ring gear 194 are rotated relative to each other by an amount corresponding to two teeth, i.e., a difference therebetween with respect to the number of teeth, so that the speed reducer 172 has a reduction gear ratio of 1/200. This ratio of 1/200 is a relatively low reduction gear ratio, and means that a rotational speed of the actuator 152 relative to a rotational speed of the motor 170 is relative low. Owing to the low reduction gear ratio, the motor 170 of the actuator 152 can be made compact in size. Further, owing to the low reduction gear ratio, the actuator 152 is made hard to be actuated by, for example, an external force applied thereto.

When the motor 170 is driven, the L-shaped bar 150 is rotated by a motor force that is generated by the motor 170, whereby the shaft portion 156 of the L-shaped bar 150 is twisted. As a result of the twisting deformation or torsion of the shaft portion 156, a reaction force is generated and then transmitted to the second lower arm 36 via the arm portion 158, link rod 162 and link-rod connection portion 164. This reaction force acts as a displacement force forcing upwardly or downwardly a distal end portion of the second lower arm 36 toward or away from the vehicle body 14, namely, forcing the corresponding wheel 12 and the vehicle body 14 toward each other or away from each other. That is, an actuator force, which is a force generated by the actuator 152, acts as the displacement force through the L-shaped bar 150 serving as an elastic body. In this respect, the adjuster device 54 can be considered to have a function serving as a displacement force generator that is configured to generate the displacement force. By adjusting an amount of the displacement force, it is possible to adjust a vertical distance between the vehicle body 14 and the wheel 12, i.e., a distance between the sprung and unsprung portions.

Figure 10:
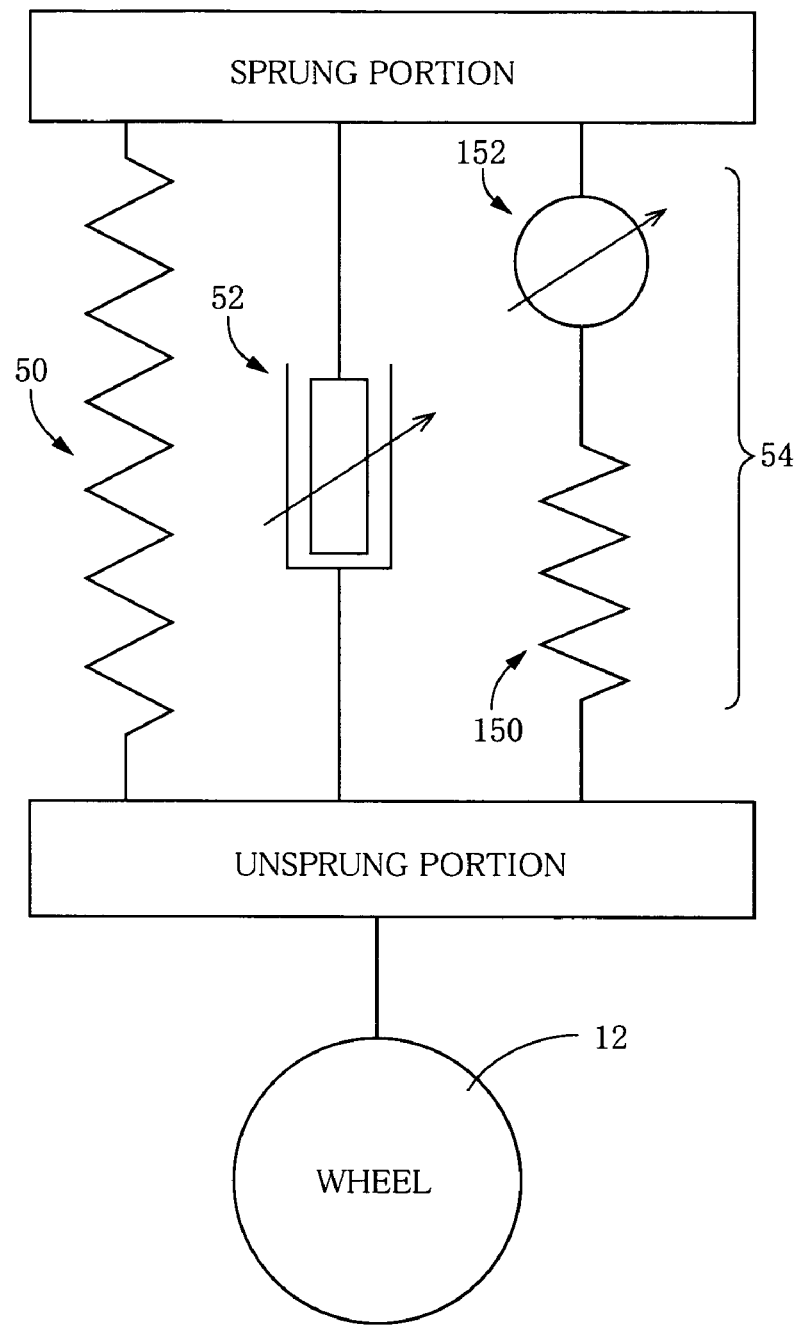
FIG. 10 is a view schematically showing the suspension device of FIG. 5.

Each suspension device 20 has a construction that is conceptually illustrated in FIG. 10. As is understood from FIG. 10, the coil spring 50, shock absorber 52 and adjuster device 54 are disposed in parallel with one another between a part of the vehicle body 14 as the sprung portion including the mount portion 56 and the unsprung portion including the second lower arm 36. The adjuster device 54 is constituted by the L-shaped bar 150 (serving as the elastic body) and the actuator 152 that are disposed in series with each other between the sprung and unsprung portions. In other words, the L-shaped bar 150 is disposed in parallel with the coil spring 50 and the shock absorber 52, and the actuator 152 is disposed between the L-shaped bar 150 and the mount portion 56 (as the part of the vehicle body) so as to interconnect the L-shaped bar 150 and the mount portion 56.

The adjuster device 54 is configured to generate the displacement force causing the sprung and unsprung portions to be displaced toward or away from each other, and is capable of changing an amount of the displacement force. Described specifically, the actuator 152 causes the L-shaped bar 150 as the elastic body to be deformed by the actuator force that is based on the motor force, namely, causes the shaft portion 156 of the L-shaped bar 150 to be twisted by the actuator force, so that the actuator force serves as the displacement force that is applied to the sprung and unsprung portions of the vehicle via the L-shaped bar 150. The displacement force is based on an elastic force generated by the deformation of the L-shaped bar 150, and the generated elastic force is based on the twisting deformation of the shaft portion 156. The amount of twisting deformation of the shaft portion 156 corresponds to the amount of actuation of the actuator 152, i.e., the rotational angle of the motor 170. That is, the amount of the displacement force can be changed by changing the rotational angle of the motor 170. Therefore, in the present suspensions system 10, the rotational angle of the motor 170 is controlled for generating a target amount of the displacement force acting on the sprung and unsprung portions.

There will be described an efficiency of the actuator 152, which is categorized into a positive efficiency and a negative efficiency. The actuator negative efficiency $\eta_N$ corresponds to a parameter indicative of an amount of the motor force minimally required to inhibit the rotation of the motor 170 that could be caused by an external force acting on the motor 170. More precisely, the negative efficiency $\eta_N$ is defined as a ratio of the amount of the motor force minimally required to inhibit the rotation of the motor 170 caused by the external force, to an amount of the external force. On the other hand, the actuator positive efficiency $\eta_P$ corresponds to a parameter indicative of the amount of the motor force minimally required to cause the shaft portion 156 of the L-shaped bar 150 to be rotated against the external force. More precisely, the positive efficiency $\eta_P$ is defined as a ratio of an amount of the external force, to the amount of the motor force minimally required to cause the rotation of the shaft portion 156. The positive effi ciency $\eta_P$ and the negative efficiency $\eta_N$ can be expressed by respective expressions as follows:

Positive efficiency $\eta_P = Fa_P/Fm_P$

Negative efficiency $\eta_N = Fm_N/Fa_N$, where "Fa" represents the actuator force (that may be considered as actuator torque), and "Fm" represents the motor force (that may be considered as motor torque) generated by the motor 170.

Figure 11:
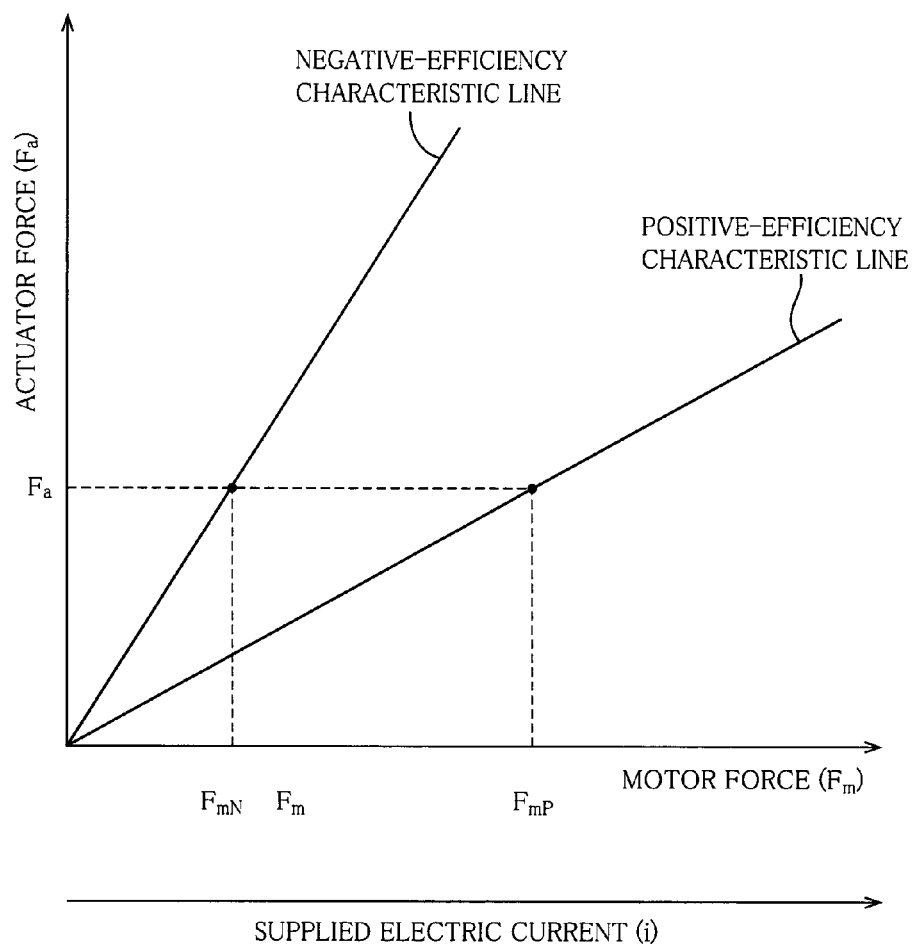
FIG. 11 is a graph conceptually showing a positive efficiency and a negative efficiency of the actuator of FIG. 9.

FIG. 11 is a graph representing a relationship between the motor force and the actuator force. The positive efficiency $\eta_P$ corresponds to an inclination of a positive-efficiency characteristic line that is shown in FIG. 11, while the negative efficiency $\eta_N$ corresponds to an inverse of an inclination of a negative-efficiency characteristic line that is also shown in FIG. 11. As is understood from FIG. 11, for producing the same amount of the actuator force Fa, the motor force amount $Fm_P$ of the motor 170 required under the positive efficiency characteristic is considerably different from the motor force amount $Fm_N$ of the motor 170 required under the negative efficiency characteristic ($Fm_P > Fm_N$).

A positive/negative efficiency product $\eta_P \cdot \eta_N$, which is defined as a product of the positive efficiency $\eta_P$ and the negative efficiency can be considered as a ratio of an amount of the motor force minimally required to inhibit an actuation of the actuator caused by a certain amount of the external force, to an amount of the motor force minimally required to cause the actuation of the actuator against the certain amount of the external force. Therefore, a low value of the positive/negative efficiency product $\eta_P \cdot T_N$ indicates that a low ratio of the motor force amount $Fm_N$ required under the negative efficiency characteristic to the motor force amount $Fm_P$ of the motor 140 required under the positive efficiency characteristic. That is, a low value of the positive/negative efficiency product indicates that the actuator is hard to be actuated by the external force.

As is understood from FIG. 11, the positive/negative efficiency product $\eta_P \cdot \eta_N$ is relative low, specifically, 1/3 in the present actuator 152, so that the actuator 152 is relatively hard to be actuated by the external force. Owing to the relatively low value of the positive/negative efficiency product $\eta_P \cdot \eta_N$, the required amount of the motor force can be made smaller when an operating position of the actuator 152 is to be maintained under application of the external force thereto, than when the actuator 152 is to be actuated against the external force. Since it can be considered that the motor force is proportional to an electric power supplied to the motor, it is possible to remarkably reduce consumption of the electric power in the present actuator 152 in which the positive/negative efficiency product $\eta_P \cdot \eta_N$ is relatively low.

In the present system 10, the adjuster device 54 has difficulty in coping with vibration of relatively high frequency range because of, for example, fact that the positive/negative efficiency product $\eta_P \cdot \eta_N$ of the actuator 152 of the adjuster device 54 is relatively small. In view of this, the shock absorber 52 included in the present system 10 is adapted to be normally suitable for damping vibration of relatively high frequency range, for making it possible to restrain transmission of the relatively high frequency vibration to the vehicle body. That is, in the present system 10, vibration of relatively low frequency range (that can be sufficiently followed by actuation of actuation of the actuator 152), namely, vibration of sprung-portion resonance-frequency range is coped with by the adjuster device 54, while vibration of relatively high frequency range including unsprung-portion resonance-frequency is coped with by the shock absorber 52. To this end, the above-described standard damping level $C_M$ of the damping coefficient of the shock absorber 52 is set to be a low value, for enabling the shock absorber 52 to reliably damp the vibration of relatively high frequency range. Specifically described, the standard damping level $C_M$ of the damping coefficient of the shock absorber 52 is set to 1500 N·sec/m (as a value obtained under an assumption that the hydraulic damping force is arranged to act directly on the wheel that is displaced relative to the vehicle body), which is lower than a half of 3000-5000 N·sec/m that is a damping coefficient of a conventional shock absorber of a suspension system not having the adjuster device 54.

(iv) Construction of Control Unit

Figure 12:
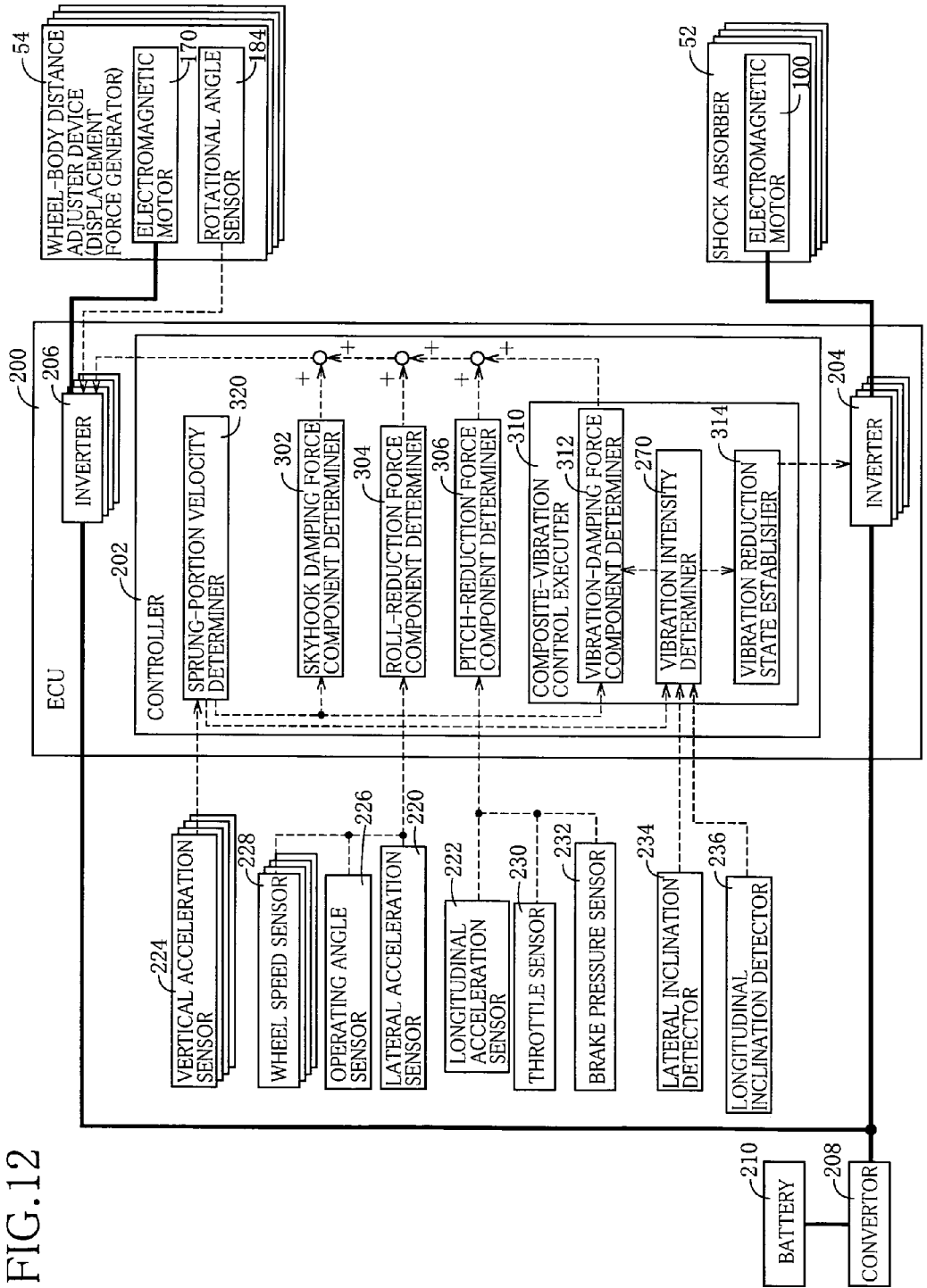
FIG. 12 is a block diagram showing various functional portions of a suspension electronic control unit for controlling the suspension system of FIG. 4.

In the present suspension system 10, as shown in FIG. 4, a suspension electronic control unit (suspension ECU) 200 as a control unit is provided for controlling the four suspension devices, more specifically described, controlling actuations of the damping coefficient changers of the respective four shock absorbers 52 and actuations of the actuators 152 of the respective four adjuster devices 54. As shown in FIG. 12, the suspension ECU 200 includes a controller 202 that is constituted principally by a computer including CPU, ROM and RAM, four inverters 204 serving as drive circuits for the motors 100 of the respective shock absorbers 52, and four inverters 206 serving as drive circuits for the motors 170 of the respective actuators 152. The inverters 204, 206 are connected to a battery 210 via a converter 208, so that an electric power is supplied to the motors 100 of the shock absorbers 52 and the motors 170 of the respective actuators 152 from an electric power source that is constituted by the converter 208 and the battery 210.

Each of the motors 170 included in the actuators 152 of the respective adjuster devices 54 is driven by a constant voltage, and an amount of the electric power supplied to each motor 170 is changed by changing an amount of electric current supplied to each motor 170. The amount of the supplied electric power is changed by changing a ratio (i.e., duty ratio) of pulse ON time to a sum of the pulse ON time and pulse OFF time in PWM (pulse width modulation) control that is performed by the corresponding inverter 206.

To the controller 202 of the suspension ECU 200, there are connected a lateral acceleration sensor 220, a longitudinal acceleration sensor 222, vertical acceleration sensors 224, an operating angle sensor 226, wheel speed sensors 228, a throttle sensor 230, a brake pressure sensor 232, a lateral inclination detector 234 and a longitudinal inclination detector 236, in addition to the above-described rotational angle sensors 184. The lateral acceleration sensor 220 is configured to detect an actual acceleration of the vehicle body 14 as measured in the lateral direction of the vehicle. The longitudinal acceleration sensor 222 is configured to detect the actual acceleration of the vehicle body 14 as measured in a longitudinal direction of the vehicle. Each of the vertical acceleration sensors 224 is provided in the corresponding mount portion 56 of the vehicle body 14, and is configured to detect a sprung-portion vertical acceleration, i.e., the actual acceleration of the corresponding mount portion 56 as measured in the vertical direction of the vehicle. The operating angle sensor 226 is configured to detect an operating angle of a steering wheel as a steering operating member, i.e., an operating amount (as a kind of a steering amount) of the steering wheel. Each of the wheel speed sensors 228 is configured to detect a rotational speed of a corresponding one of the four wheels 12. The throttle sensor 230 is configured to detect an opening angle of an acceleration throttle valve. The brake pressure sensor 232 is configured to detect a pressure in a brake master cylinder. The lateral inclination detector 234 is configured to detect an inclination of the vehicle body as measured in a lateral direction of the vehicle. The longitudinal inclination detector 236 is configured to detect an inclination of the vehicle body as measured in the longitudinal direction of the vehicle. The suspension ECU 200 is configured to control actuations of the shock absorbers 52 and actuations of the actuators 152, based on signals transmitted from the above-described sensors and detectors that are connected to the controller 202 of the ECU 200. It is noted that the ROM included in the computer of the controller 202 stores therein programs and various data used for controlling the shock absorbers 52 and the actuators 152.

<Controls in Suspension System>

(i) Outline of Controls in Suspension System

In the present suspension system 10, a skyhook control, a roll reduction control, a pitch reduction control and a composite vibration control can be executed concurrently with each other. The skyhook control is executed, based on a so-called "skyhook damper theory", for damping vibration occurring in each of four sprung portions that correspond to the respective wheels 12. The roll reduction control is executed for restraining or reducing roll of the vehicle body that could arise from turning of the vehicle. The pitch reduction control is executed for restraining or reducing pitch of the vehicle body that could arise from acceleration and deceleration of the vehicle. The composite vibration control is executed for damping a plurality of vehicle-body vibrations that are different in kind from one another. Basically, the displacement forces generated by the respective adjuster devices 54 are controlled independently from each other, so that the skyhook control, roll reduction control, pitch reduction control and composite vibration control can be all executed.

The above-described composite vibration control is executed for damping a composite control which occurs in the vehicle body and which can be considered to contain the plurality of vehicle-body vibrations that are different in kind from each other with respect to their relations with a center of gravity of the vehicle body, by controlling the displacement forces that are to be generated by the respective adjuster devices 54. Described specifically, in execution of the composite vibration control, a plurality of vibration damping controls in the form of a bounce-vibration damping control, a roll-vibration damping control and a pitch-vibration damping control can be all executed. The bounce-vibration damping control is to be executed for damping a bounce vibration that may be defined as a vertical vibration which occurs at the center of gravity of the vehicle body and which acts in a vertical direction of the vehicle. The roll-vibration damping control is to be executed for damping a roll vibration that may be defined as a rotary vibration which acts in a circumferential direction about an axis passing the center of gravity of the vehicle body and extending in the longitudinal direction of the vehicle. The pitch-vibration damping control is to be executed for damping a pitch vibration that may be defined as a rotary vibration which acts in a circumferential direction about an axis passing the center of gravity of the vehicle body and extending in the lateral direction of the vehicle. Thus, the composite vibration control is executed by controlling, based on a sum of displacement force components that are to be directed to the respective vibration damping controls, the displacement forces that are to be generated by the respective four adjuster devices 54.

That is, a target displacement force F* as a target amount of the displacement force F, which is to be generated by each of the four adjuster devices 54, is determined as a sum of the displacement force components in the form of a skyhook damping force component $F_S$, a roll-reduction force component $F_R$, a pitch-reduction force component $F_P$, a bounce damping force component $F_{Vb}$, a roll damping force component $F_{Vr}$ and a pitch damping force component $F_{Vp}$, which are to be directed to the skyhook control, roll reduction control, pitch reduction control, bounce-vibration damping control, roll-vibration damping control and pitch-vibration damping control, respectively. The rotational angle θ of the motor 170 of the actuator 152 is controlled such that the adjuster device 54 generates the target displacement force F*. It is noted that the damping coefficient of the shock absorber 52 is normally set to the standard damping level $C_M$. There will be described the above-described controls, particularly, methods of determining the displacement force components that are to be generated in the respective controls.

Skyhook Control

In the skyhook control, the skyhook damping force component $F_S$ for each adjuster device 54 is determined, for generating an amount of the displacement force that is dependent on velocity of vibration of the corresponding sprung portion, so as to damp the vibration of the corresponding sprung portion. Described specifically, a vertical movement velocity of each mount portion 56 of the vehicle body, i.e., a sprung-portion absolute velocity $Vu_{fil}$ (more precisely, a phase-compensated sprung-portion absolute velocity) is obtained based on result of detection made by the vertical acceleration sensor 224 that is provided in each mount portion 56. The skyhook damping force component $F_S$ is calculated based on the obtained sprung-portion absolute velocity $Vu_{fil}$ and according to the following expression:

$$F_S = K_1 \cdot C_S \cdot Vu_{fil} (K_1: \text{gain}, C_S: \text{damping coefficient}).$$

(ii) Roll Reduction Control

Upon turning of the vehicle, due to a roll moment arising from the turning of the vehicle, the sprung and unsprung portions provided for inside wheels (having a smaller turning radius) are displaced away from each other while the sprung and unsprung portions provided for outside wheels (having a larger turning radius) are displaced toward each other. In the roll reduction control, for restraining the inside sprung and unsprung portions from being displaced away from each other and restraining the outside sprung and unsprung portions from being displaced toward each other, each of the adjuster devices 54 provided for the inside wheels is controlled to cause the displacement force to force the inside sprung and unsprung portions toward each other, while each of the adjuster devices 54 provided for the outside wheels is controlled to cause the displacement force to force in the outside sprung and unsprung portions away from each other. Thus, each of the four adjuster devices 54 is controlled to generate the displacement force as a roll reduction force. Described specifically, a parameter value Gy* of the lateral acceleration (which is used as a parameter in the control) is determined, on the basis of an estimated value Gyc of the lateral acceleration estimated based on an operating angle δ of the steering wheel and a running speed v of the vehicle and also an actual value Gyr of the lateral acceleration that is measured the, and according to the following expression:

$$Gy^* = K_2 \cdot Gyc + K_3 \cdot Gyr (K_2, K_3: \text{gains}).$$

The roll-reduction force component $F_R$ is determined based on the lateral acceleration parameter value Gy* (that serves an index of the roll movement received by the vehicle body) and according to the following expression:

$$F_R = K_4 \cdot Gy^* (K_4: \text{gain}).$$

(iii) Pitch Reduction Control

When a front-end dive of the vehicle body is caused upon deceleration (e.g., braking) of the vehicle, due to a pitch moment causing the front-end dive of the vehicle body, the sprung and unsprung portions provided for front wheels are displaced toward each other while the sprung and unsprung portions provided for rear wheels are displaced away from each other. When a rear-end squat of the vehicle body is caused upon acceleration of the vehicle, due to a pitch moment causing the rear-end squat of the vehicle body, the sprung and unsprung portions provided for front wheels are displaced away from each other while the sprung and unsprung portions provided for rear wheels are displaced toward each other. In the pitch reduction control, for restraining change of a vertical distance between the sprung and unsprung portions, each of the four adjuster devices 54 is controlled to generate the displacement force as a pitch reduction force. The pitch-reduction force component Fp is determined based on the longitudinal acceleration serving as an index of the pitch moment received by the vehicle body. Described in detail, the pitch-reduction force component Fp is determined on the basis of a longitudinal acceleration actual value Gx that is actually measured by the longitudinal acceleration sensor 222, and according to the following expression:

$$F_P = K_S \cdot Gx \,(K_S\text{:gain})$$

It is noted that the pitch reduction control is executed when the opening angle of an acceleration throttle valve detected by the throttle sensor 230 or the pressure of the brake master cylinder detected by the brake pressure sensor 232 exceeds a predetermined threshold value.

(v) Composite Vibration Control

In the composite vibration control, a composite-vibration damping force component $F_V$, which is to be generated by each of the four adjuster devices 54, is determined as a sum of the bounce damping force component $F_{Vb}$, roll damping force component $F_{Vr}$ and pitch damping force component $F_{Vp}$, which are to be directed to the bounce-vibration damping control, roll-vibration damping control and pitch-vibration damping control, respectively. The composite-vibration damping force component $F_V$ is determined based on detected values of the four vertical acceleration sensors 224 provided for the respective wheels 12. Referring to a block diagram of FIG. 13, there will be described a process of determining the composite-vibration damping force component $F_V$.

(a) Determination of Sprung-Portion Velocity

The detected values detected by the respective vertical acceleration sensors 224 are transmitted to a noise eliminator 250. The noise eliminator 250 includes a low-pass filter (LPF) and a high-pass filter (HPF), so that vibration components (i.e., noises) whose frequencies are considerably high (for example, higher than 24 Hz) and components whose frequencies are lower than a cut-off frequency (e.g., 0.1 Hz) are eliminated from the detected value, by the high-pass filter and the low-pass filter, respectively. Then, the vibration (i.e., sprung-portion acceleration value $G_U$) thus processed by the noise eliminator 250 is supplied to a sprung-portion absolute velocity calculator 252 that includes an integrator. The sprung-portion acceleration value $G_U$ is integrated whereby the sprung-portion absolute velocity $V_U$ is obtained in the sprung-portion absolute velocity calculator 252.

Then, the sprung-portion absolute velocity $V_U$ is transmitted to a phase compensator 254 as a phase advancer. Each of the adjuster devices 54 has a response delay that is a length of time from a point of time at which a command indicative of a target amount of the displacement force is issued by the ECU 200 to a point of time at which an actual amount of the displacement force (generated by the actuator 152 and acting on the corresponding sprung and unsprung portions) reaches the target amount. In view of such a response delay of each adjuster device 54, the phase compensator 254 is provided. The phase compensator 254 includes a vibration phase advancer, and is configured to advance phase of the sprung-portion vibration that is represented by the sprung-portion absolute velocity $V_U$. More precisely, since the adjuster device 54 is provided for mainly coping with vibration of the sprung-portion resonance-frequency range, the phase compensator 254 advances phase of a resonance-frequency vibration component of the sprung-portion vibration by a predetermined degree. The phase compensator 254 outputs a phase-compensated sprung-portion absolute velocity $Vu_{fil}$ as the advanced sprung-portion velocity. Described specifically, the phase of the sprung-portion absolute velocity $V_U$ is advanced by taking account of phase of the sprung-portion acceleration value $G_U$ processed by the noise eliminator 250, so that the phase-compensated sprung-portion absolute velocity $Vu_{fil}$ is calculated according to the following expression:

$$Vu_{fil} = K \cdot (P \cdot Vu + D \cdot dVu/dt) = K \cdot (P \cdot Vu + D \cdot Gu)$$

Figure 14A:
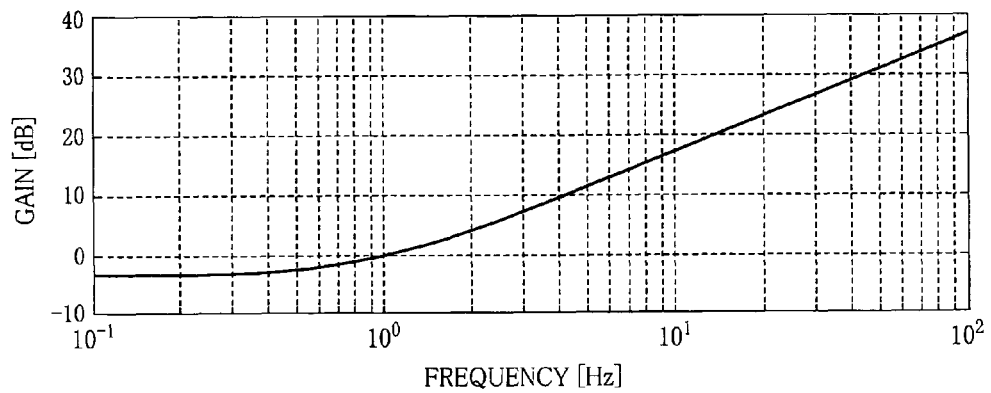
FIGS. 14A and 14B are Bode diagrams showing characteristics of a vibration phase advancer of FIG. 13.
Figure 14B:
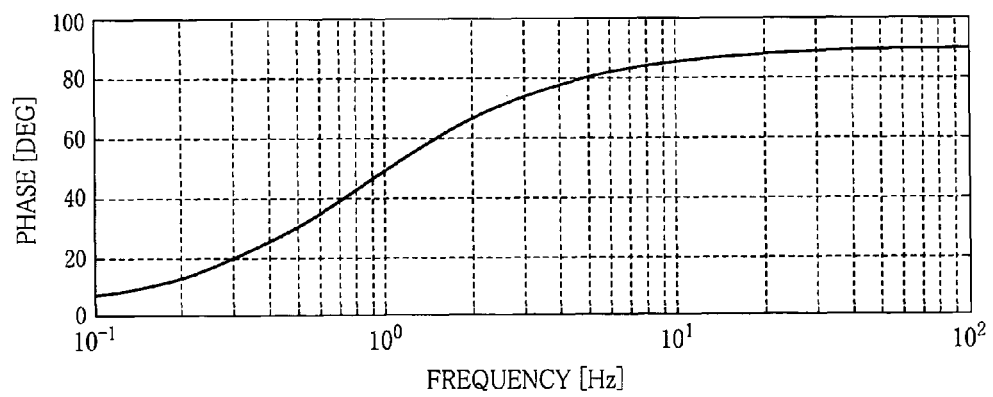

In the above expression, "K", "P" and "D" represent a compensation gain, a proportional gain and a derivative gain, respectively, which are set to suitable values determined such that the phase of the resonance-frequency vibration component having the sprung-portion resonance frequency (1.0 Hz) is advanced by a predetermined degree, and such that an amplitude of the resonance-frequency vibration component upon input to the phase compensator 254 and an amplitude of the resonance-frequency vibration component upon output from the phase compensator 254 are substantially equal to each other. FIG. 14A shows a gain of the phase compensator 254 with respect to each frequency. FIG. 14B shows a degree by which the sprung-portion vibration is advanced in each frequency by the phase compensator 254. It is noted that the gain of the phase compensator 254 shown in FIG. 14A is a value that is twenty times as large as a common logarithm of a ratio of amplitude of the output to amplitude of the input.

(b) Determination of Vibration Damping Components for Vibration Damping Controls The phase-compensated sprung-portion absolute velocities $Vu_{fil}$ in the respective four sprung portions (corresponding to the respective four wheels 12), which are outputted from the phase compensator 254, are transmitted to a vibration velocity converter 256. In the vibration velocity converter 256, a bounce velocity $V_b$, a roll velocity $V_r$ and a pitch velocity $V_p$ as velocities of respective movements of the vehicle body 14 that are to be damped by the bounce-vibration damping control, roll-vibration damping control and pitch-vibration damping control, are estimated based on the phase-compensated sprung-portion absolute velocities $Vu_{fil}$ ($V_{FR}$, $V_{FL}$, $V_{RR}$, $V_{RL}$) in the respective four sprung portions. Described in detail, the bounce velocity $V_b$, roll velocity $V_r$ and pitch velocity $V_p$ are calculated by taking account of a distance between each wheel 12 and the center of gravity of the vehicle, according to the following expressions:

$$V_b = (V_{FR} + V_{FL} + V_{RR} + V_{RL})/4$$

$$V_r = (V_{FR} - V_{FL} + V_{RR} - V_{RL})/4$$

$$V_p = (V_{FR} + V_{FL} - V_{RR} - V_{RL})/4$$

The above expressions are formulated under an assumption that the four wheels 12 are distant from the center of gravity of the vehicle by the same distance that corresponds to a unit of the distance. Then, in a vibration damping force calculator 258, a bounce-vibration damping force $F_{Vb}$, a roll-vibration damping force $F_{Vr}$ and a pitch-vibration damping force $F_{Vp}$, which are to be generated in the bounce-vibration damping control, roll-vibration damping control and pitch-vibration damping control, respectively, are determined in accordance with the following expressions:

$$F_{Vb}=K_b \cdot C_b \cdot V_b$$

$$F_{Vr}=K_r \cdot C_r \cdot V_r$$

$$F_{Vp}=K_p \cdot C_p \cdot V_p$$

In the above expressions, "$C_b$", "$C_r$" and "$C_p$" represent damping coefficients against the bounce vibration, roll vibration and pitch vibration, respectively, and "$K_b$", "$K_r$" and "$K_p$" are switching gains each of which is to be switched between "1" (one) and "0" (zero), so as to determine whether a corresponding one of the bounce-vibration damping control, roll-vibration damping control and pitch-vibration damping control is to be executed or not. Each of the switching gains "$K_b$", "$K_r$" "$K_p$" is normally set to "1", and is set to "0" when a corresponding one of the bounce-vibration damping control, roll-vibration damping control and pitch-vibration damping control is not required to be executed.

In a damping force divider 260, each of the bounce-vibration damping force $F_{Vb}$, roll-vibration damping force $F_{Vr}$ and pitch-vibration damping force $F_{Vp}$, which are determined as described above, is divided among the four adjuster devices 54 provided for the respective four wheels 12, and the composite-vibration damping force component $F_V$ which is to be generated by each of the four adjuster devices 54 is determined based on a sum of the divided forces $F_{Vb}$, $F_{Vr}$, $F_{Vp}$. That is, the composite-vibration damping force components $F_V$, which are to be generated by the respective four adjuster devices 54, are determined in accordance with the following expressions:

$$F_{VFR}=(F_{Vb}+F_{Vr}+F_{Vp})/4$$

$$F_{VFL}=(F_{Vb}-F_{Vr}+F_{Vp})/4$$

$$F_{VRR}=(F_{Vb}+F_{Vr}-F_{Vp})/4$$

$$F_{VRL}=(F_{Vb}-F_{Vr}-F_{Vp})/4$$

Thus, the displacement force that is to be generated by each adjuster device 54 is controlled based on a sum of the displacement force components in the form of the bounce damping force component $F_{Vb}$, roll damping force component $F_{Vr}$ and pitch damping force component $F_{Vp}$.

(iv) Determination of Target Displacement Force

The skyhook damping force component $F_S$, roll-reduction force component $F_R$, pitch-reduction force component $F_P$ and composite-vibration damping force component $F_V$ of the displacement force are determined as described above. Then, the target displacement force F* is determined based on the determined components of the displacement force and according to the following expression:

$$F^*=F_S+F_R+F_P+F_V$$

Since the displacement force and the motor rotational angle correspond to each other, a target rotational angle θ* is determined based on the target displacement force F*. Then, the motor 170 is controlled such that an actual rotational angle θ of the motor 170 is equalized to the target rotational angle θ*. An amount of an electric current supplied to the motor 170 is determined based on a deviation Δθ(=θ*−θ) of the actual rotational angle θ from the target rotational angle θ*. In other words, the amount of the electric current supplied to the motor 170 is determined based on the rotational angle deviation Δθ and according to a feedback controlling method. Described specifically, the rotational angle deviation Δθ is obtained based on the actual rotational angle θ that is detected by the rotational angle sensor 180 of the motor 170, and then a target electric current amount i* is determined based on the rotational angle deviation Δθ and according to the following expression:

$$i^*=K_P \cdot \Delta\theta + K_I \text{Int}(\Delta\theta)$$

A right side of the above expression, which is according to PI control rule, consists of a first term and a second term that are a proportional term and an integral term, respectively. "$K_P$" and "$K_I$" represent proportional and integral gains, respectively. "Int (Δθ)" represents an integral value of the rotational angle deviation Δθ.

The direction of the motor force generated by the motor 170 is dependent on whether the target electric current amount i* is a positive value or a negative value. In control of drive of the motor 170, the duty ratio and the direction of the generated motor force are determined based on the target electric current amount i*. Then, a command indicative of the determined duty ratio and motor force direction is supplied to the inverter 206, so that the drive of the motor 170 is controlled based on the command by the inverter 206. Thus, each of the four adjuster devices 54 is configured to generate the displacement force that is to be generated.

(v) Limitation on Vibration Damping Controls

In the present system 10, due to employment of the actuator 152 whose positive/negative efficiency product $\eta_P \cdot \eta_N$ is relatively low, for example, each adjuster device 54 has a difficulty in coping with vibrations of relatively high frequency. Further, the displacement force components of the target displacement force F* of each adjuster device 54, which are to be directed to the respective vibration damping controls, are determined based on respective vibration velocities (i.e., movement velocities of the vehicle body relating to vibrations that are to be damped by the vibration damping controls). The vibration velocities are estimated based on the sprung-portion velocities that have been subjected to the phase advance processing having characteristics shown in FIGS. 14A and 14B. In the phase advance processing, the amplitude of the vibration component whose frequency is higher than the sprung-portion resonance frequency is increased with increase of the frequency, as shown in FIG. 14A. Further, the phase of the vibration component whose frequency is higher than the sprung-portion resonance frequency is advanced by a degree that is increased with increase of the frequency, as shown in FIG. 14B. That is, the vibration of relatively high frequency range cannot be effectively damped by the displacement forces generated by the adjuster devices 54, and there is even a risk that the ride comfort could be made worse by the displacement forces. In view of this, in the present system 10, when at least one of the vehicle-body vibrations is not required in a low vibration intensity situation, at least one of the bounce-vibration damping control, roll-vibration damping control and pitch-vibration damping control, which is to be executed for damping the at least one of the vehicle-body vibrations, is not executed. The above-described low vibration intensity situation is a situation in which intensities of sprung-portion resonance frequency components (each of which is a component of sprung-portion vibration occurring in a corresponding one of the four sprung portions and has a resonance frequency of the corresponding one of the four sprung portions) are lower than a threshold intensity degree.

That is, when vibration of the sprung-portion resonance-frequency range, which is to be coped with mainly by the adjuster devices 54, is not caused in the vehicle body, the executions of the vibration damping controls are limited whereby generation of the displacement force by each adjuster device 54 is limited.

In the present system 10, it is judged whether the vehicle is in the low vibration intensity situation or not, according to a so-called sprung-portion resonance judgment logic. Described specifically, the judgment is made in a vibration intensity determiner 270, on the basis of the sprung-portion absolute velocities $V_U$ that are obtained by the integrating the sprung-portion acceleration values $G_U$ (of the respective four sprung portions) in the sprung-portion absolute velocity calculator 252. It is judged that the vehicle is in the low vibration intensity situation when maximum values of the sprung-portion absolute velocities $V_U$ within a predetermined length $t_0$ of time up to a current point of time are lower than a threshold velocity value $V_0$. When it is judged that the vehicle is in the low vibration intensity situation, at least one of the switching gains $K_b$, $K_r$, $K_p$, each of which is directed to one of the vibration damping controls that is not required to be executed, is set to "0", so that at least one of the bounce-vibration damping force $F_{Vb}$, roll-vibration damping force $F_{Vr}$ and pitch-vibration damping force $F_{Vp}$ is set to "0" in the vibration damping force calculator 258, for thereby refraining from generating at least one of the damping forces, each of which is to be generated in the vibration damping control that is not required to be executed.

Figure 15:
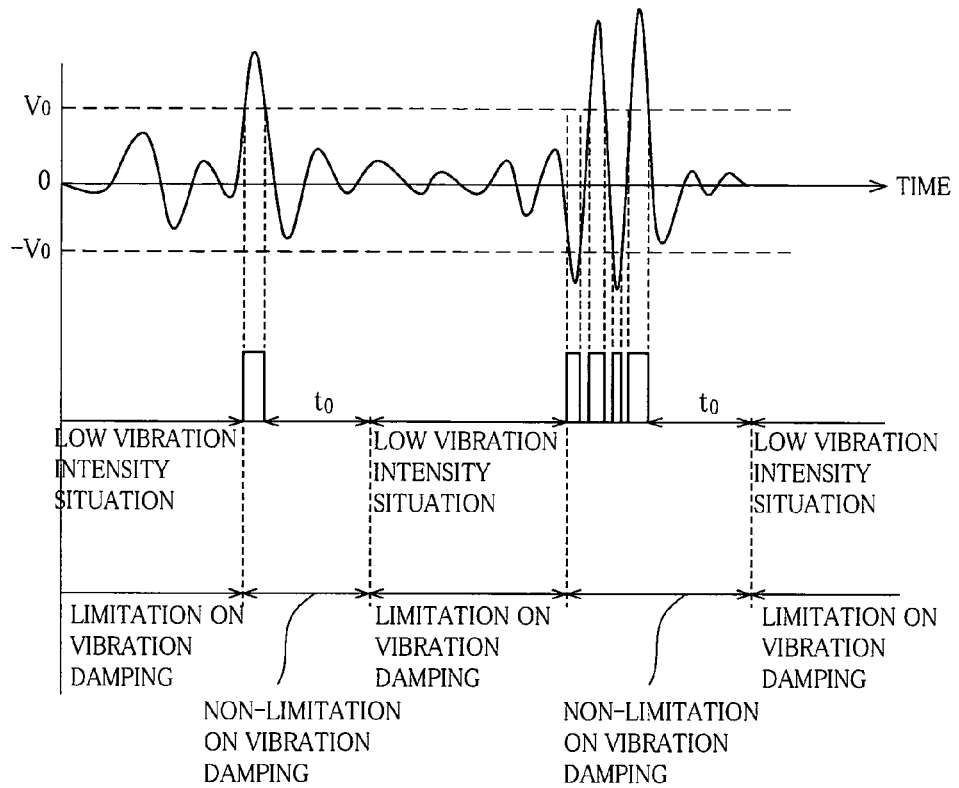
FIG. 15 is a view conceptually showing how it is judged whether intensities of sprung-portion resonance-frequency vibration components in respective four sprung portions (that correspond to the four wheels) are lower than a threshold intensity degree or not.

FIG. 15 shows basic control stages in which all of the vibration damping controls are executed and limitation stages in which executions of the vibration damping controls are limited, in a case in which the sprung-portion absolute velocity of one of the sprung portions is changed as shown in FIG. 15. Whether the vehicle is in the low vibration intensity situation or not, namely, whether execution of at least one of the vibration damping controls is to be limited or not, is judged depending on whether the maximum values of the sprung-portion absolute velocities $V_U$ within the predetermined length $t_0$ of time up to a current point of time are lower than the threshold velocity value $V_0$. That is, in the present system 10, when the predetermined length $t_0$ of time has passed since the sprung-portion absolute velocities $V_U$ became lower than the threshold velocity value $V_0$, the execution of at least one non-required vibration damping control is limited. In other words, the executions of the three vibration damping controls are not limited until the predetermined length $t_0$ of time passes since the sprung-portion absolute velocities $V_U$ became lower than the threshold velocity value $V_0$, so that the three vibration damping controls are executed until intensities of the sprung-portion resonance frequency components become sufficiently low. Although FIG. 15 shows change of the sprung-portion absolute velocity of one of the four sprung portions, it is judged that the vehicle is in the low vibration intensity situation, when the maximum values of the sprung-portion absolute velocities $V_U$ within the predetermined length $t_0$ of time up to the current point of time are all lower than the threshold velocity value $V_0$.

When it is judged that the vehicle is in the low vibration intensity situation, it is judged whether each of the three vibration damping controls is required to be executed or not, based on an intensity of a corresponding one of the vehicle-body vibrations that is to be damped in the each of the three vibration damping controls. Described in detail, the intensity of the bounce vibration is estimated based on a vertical acceleration of the vehicle body (more specifically, an average of the sprung-portion acceleration values $G_U$ of the respective four sprung portions that are detected by the respective vertical acceleration sensors 224). The intensity of the roll vibration is estimated based on an angle of inclination of the vehicle body in the lateral direction of the vehicle, which is detected by the lateral inclination detector 234. The intensity of the pitch vibration is estimated based on an angle of inclination of the vehicle body in a longitudinal direction of the vehicle, which is detected by the longitudinal inclination detector 236. It is judged that the bounce-vibration damping control is not required to be executed when a maximum sprung-portion acceleration values $G_Z$ (i.e., a maximum value of the average of the sprung-portion acceleration values $G_U$ within the predetermined length $t_0$ of time up to the current point of time) is not larger than a threshold value $G_{Z0}$. It is judged that the roll-vibration damping control is not required to be executed when a maximum lateral inclination angle $\alpha$ (i.e., a maximum value of the lateral inclination angle within the predetermined length $t_0$ of time up to the current point of time) is not larger than a threshold value $\alpha_0$. It is judged the pitch-vibration damping control is not required to be executed when a maximum longitudinal inclination angle $\beta$ (i.e., a maximum value of the longitudinal inclination angle within the predetermined length $t_0$ of time up to the current point of time) is not larger than a threshold value $\beta_0$.

Figure 16:
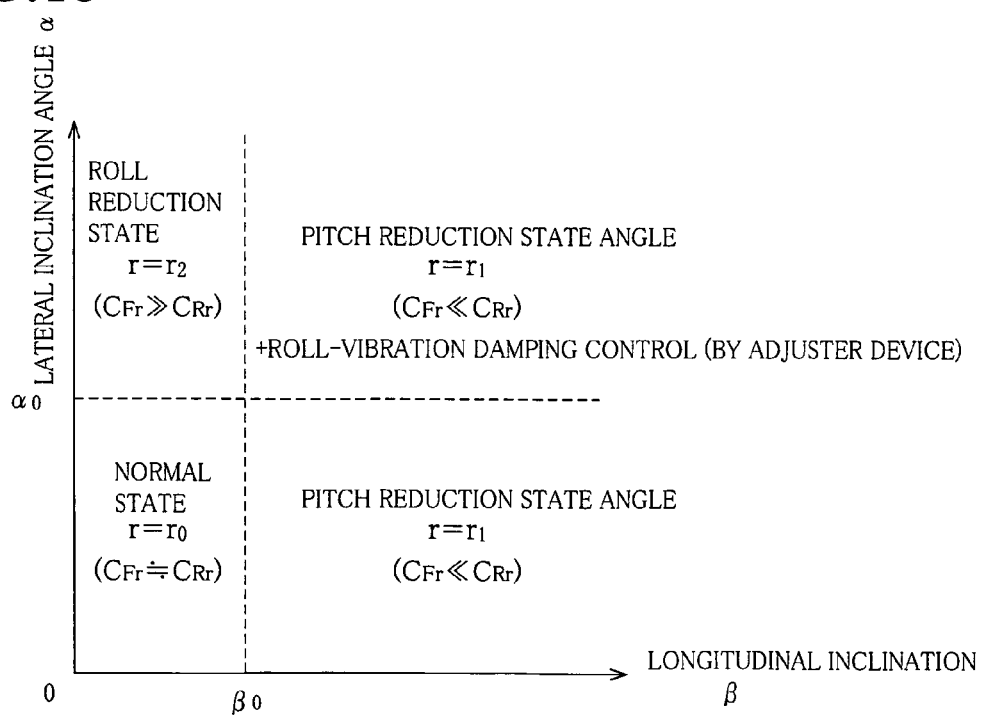
FIG. 16 is a view showing a relationship among a lateral inclination angle α, a longitudinal inclination angle β and a state that is established by the shock absorbers.

However, when the maximum lateral inclination angle $\alpha$ and/or maximum longitudinal inclination angle $\beta$ are larger than the threshold value $\alpha_0$ and/or threshold value $\beta_0$ and it is judged that at least one of the roll vibration and pitch vibration is required to be damped, the ECU 200 can establish a roll reduction state instead of causing the adjuster device 54 to execute the roll-vibration damping control, or establish a pitch reduction state instead of causing the adjuster device to execute the pitch-vibration damping control. The roll reduction state is a state suitable for reducing the roll vibration, and can be established by controlling the damping coefficients of the four shock absorbers 52. The pitch reduction state is a state suitable for reducing the pitch vibration, and can be established by controlling the damping coefficients of the four shock absorbers 52. FIG. 16 shows a relationship among the lateral inclination angle $\alpha$, the longitudinal inclination angle $\beta$, the state established by the shock absorbers and the vibration damping control executed by the adjuster devices 54.

The above-described roll reduction state and pitch reduction state will be described in detail. The ECU 200 is capable of selectively establishing the roll reduction state and the pitch reduction state, by selectively establishing a first state and a second state. The first state is a state in which the a front-side damping coefficient $C_{Fr}$ as the damping coefficient of each of the two shock absorbers 52FR, 52FL (provided for the front wheels 12FR, 12FL) is larger than a rear-side damping coefficient $C_{Rr}$ as the damping coefficient of each of the two shock absorbers 52RR, 52RL (provided for the rear wheels 12RR, 12RL). On the other hand, the second state is a state in which the rear-side damping coefficient $C_{Rr}$ is larger than the front-side damping coefficient $C_{Fr}$. It is noted that the front-side damping coefficient $C_{Fr}$ and the rear-side damping coefficient $C_{Rr}$ are both set to the standard damping level $C_M$ so as to be held in the same value in a normal state in which neither the pitch reduction state nor the roll reduction state is established.

It varies from vehicle to vehicle which one of the pitch reduction state and the roll reduction state corresponds to the first state (in which the front-side damping coefficient $C_{Fr}$ is larger than the rear-side damping coefficient $C_{Rr}$) or the second state (in which the rear-side damping coefficient $C_{Rr}$ is larger than the front-side damping coefficient $C_{Fr}$). In the present system 10, the ECU 200 establishes, as the pitch reduction state, one of the first and second states that is predetermined based on a relationship between a front-side resonance frequency $\omega_{Fr}$ as the resonance frequency of each of front two of the four sprung portions and a rear-side resonance frequency $\omega_{Rr}$ as the resonance frequency of each of rear two of the four sprung portions. The sprung-portion resonance frequency $\omega$ is represented by an expression $\omega=(k/m)^{1/2}$, where "k" represents spring constant of the suspension spring 50, and "m" represents mass of the sprung portion (i.e., share load W divided by gravitational acceleration g). The spring constant k and the sprung portion mass m in the rear-wheel-side portion are different from those in the front-wheel-side portion, so that the rear-side resonance frequency $\omega_{Rr}$ is set to be higher than the front-side resonance frequency $\omega_{Fr}$ in the vehicle in which the present suspension system 10 is installed.

A damped vibration frequency $\omega_d$, which can be obtained from an equation of motion in a damped vibration model of single-degree-of-freedom, is expressed by the following expression:

$$\omega_d=(1-\zeta^2)^{1/2}\cdot\omega \text{(where } \zeta<1) \tag{5}$$

In the above expression, "$\zeta$ $(=C/C_C)$" represents a damping ratio, wherein "$C_C$ $(=2\cdot(m\cdot k)^{1/2})$" represents a critical damping coefficient. Since the front-side damping coefficient $C_{Fr}$ and the rear-side damping coefficient $C_{Rr}$ are equal to each other in the normal state, the damped vibration frequency $\omega_d$ is dependent on the sprung-portion resonance frequency $\omega$ so that a rear-side damped vibration frequency $\omega_{dRr}$ as the damped vibration frequency $\omega_d$ in the rear-wheel-side portion is higher than a front-side damped vibration frequency $\omega_{dFr}$ as the damped vibration frequency $\omega_d$ in the front-wheel-side portion. It is noted that, in the vehicle in which the present system 10 is installed, the damping ratio $\zeta$ is tuned such that vibration arisen upon passage of wheel over a protrusion or recess on a road surface settles down in a length of time that is slightly larger than one cycle of the vibration.

There will be described a case in which the front left wheel 12FL and the rear left wheel 12RL pass over a protrusion on a road surface during a forward running of the vehicle, namely, in which the front left wheel 12FL and the rear left wheel 12RL sequentially pass over the protrusion. In this case, the damped vibration having the front-side damped vibration frequency $\omega_{dFr}$ occurs in the front-wheel side portion (i.e., each of front two of the four sprung portion), while the damped vibration having the rear-side damped vibration frequency $\omega_{dRr}$ occurs in the rear-wheel side portion (i.e., each of rear two of the four sprung portion). In the vehicle equipped with the present system 10, since the rear-side damped vibration frequency $\omega_{dRr}$ is higher than the front-side damped vibration frequency $\omega_{dFr}$, as described above, it is common that displacement of the rear-wheel side portion in the rebound direction is maximized before displacement of the front-wheel side portion in the rebound direction is maximized. In other words, it is common that a rear-wheel-side-portion maximum displacement time is shorter than a front-wheel-side-portion maximum displacement time during the forward running of the vehicle over a protrusion or a recess on the road surface, wherein the front-wheel-side-portion maximum displacement time is defined as a length of time from a point of time at which the front wheels reach the protrusion to a point of time at which an amount of displacement of the front-wheel-side portion in the rebound direction is maximized, or as a length of time from a point of time at which the front wheels reach the recess to a point of time at which an amount of displacement of the front-wheel-side portion in the bound direction is maximized, and wherein the rear-wheel-side-portion maximum displacement time is defined as a length of time from the point of time at which the front wheels reach the protrusion to a point of time at which an amount of displacement of the rear-wheel-side portion in the rebound direction is maximized, or as a length of time from the point of time at which the front wheels reach the recess to a point of time at which an amount of displacement of the rear-wheel-side portion in the bound direction is maximized. A pitch angle of the vehicle body is reduced by making the amount of the displacement of the front-wheel-side portion in a bound direction and the amount of the displacement of the rear-wheel-side portion in the bound direction be maximized concurrently with each other, namely, by eliminating a difference between the rear-wheel-side-portion maximum displacement time and the front-wheel-side-portion maximum displacement time. That is, the pitch angle can be made small by increasing the front-side damped vibration frequency $\omega_{dFr}$ so as to advance phase of the damped vibration in the front-wheel-side portion, and/or reducing the rear-side damped vibration frequency $\omega_{dRr}$ so as to delay phase of the damped vibration in the rear-wheel-side portion. Therefore, in the present system 10, the pitch reduction state can be established by establishing the second state in which the rear-side damping coefficient $C_{Rr}$ is larger than the front-side damping coefficient $C_{Fr}$, i.e., in a state in which the front-side damping coefficient $C_{Fr}$ is set to the low damping level $C_L$ while the rear-side damping coefficient $C_{Rr}$ is set to the high damping level $C_H$.

On the other hand, it is possible to establish a state in which the roll vibration is hard to be caused in the vehicle body, by offsetting the point of time at which the amount of displacement of the front-wheel-side portion in the rebound direction is maximized and the point of time at which the amount of displacement of the rear-wheel-side portion in the rebound direction is maximized, from each other, such that the damped vibration in the front-wheel-side portion and the damped vibration in the rear-wheel-side portion are made opposite in phase to each other. This is because the vehicle body as a whole is difficult to be rolled owing to high degree of stiffness of the vehicle body when the front-wheel-side portion and rear-wheel-side portion are forced to be rolled in respective directions that are opposite to each other. That is, the roll of the vehicle body can be reduced by reducing the front-side damped vibration frequency $\omega^{dFr}$ so as to delay phase of the damped vibration in the front-wheel-side portion, and/or increasing the rear-side damped vibration frequency $\omega_{dRr}$ so as to advance phase of the damped vibration in the rear-wheel-side portion. Therefore, in the present system 10, the roll reduction state can be established by establishing the first state in which the front-side damping coefficient $C_{Fr}$ is larger than the rear-side damping coefficient $C_{Rr}$, i.e., in a state in which the front-side damping coefficient $C_{Fr}$ is set to the high damping level $C_H$ while the rear-side damping coefficient $C_{Rr}$ is set to the low damping level $C_L$.

There will be described a case in which one of the maximum lateral inclination angle $\alpha$ and maximum longitudinal inclination angle $\beta$ is larger than a corresponding one of the threshold values $\alpha_0$, $\beta_0$. When the maximum lateral inclination angle $\alpha$ is larger than the threshold value $\alpha_0$ and the maximum longitudinal inclination angle $\beta$ is not larger than the threshold value $\beta_0$, the roll reduction state is established by controlling the damping coefficients of the respective four shock absorbers 52 so as to establish the first state in which the front-side damping coefficient $C_{Fr}$ is larger than the rear-side damping coefficient $C_{Rr}$, while the roll-vibration damping control and the pitch-vibration damping control are not executed by the adjuster devices 54. When the maximum lateral inclination angle α is not larger than the threshold value $\alpha_0$ and the maximum longitudinal inclination angle β is larger than the threshold value $\beta_0$, the pitch reduction state is established by controlling the damping coefficients of the respective four shock absorbers 52 so as to establish the second state in which the rear-side damping coefficient $C_{Rr}$ is larger than the front-side damping coefficient $C_{Fr}$, while the roll-vibration damping control and the pitch-vibration damping control are not executed by the adjuster devices 54.

There will be next described a case in which the maximum lateral inclination angle α and maximum longitudinal inclination angle β are larger than the threshold values $\alpha_0$, $\beta_0$, respectively. In this case, the pitch reduction state is established, by controlling the damping coefficients of the respective four shock absorbers 52 so as to establish the second state in which the rear-side damping coefficient $C_{Rr}$ is larger than the front-side damping coefficient $C_{Fr}$, while the roll-vibration damping control is executed by the adjuster devices 54 without the pitch-vibration damping control being executed. This arrangement may be modified such that the roll reduction state is established, by controlling the damping coefficients of the respective four shock absorbers 52 so as to establish the first state in which the front-side damping coefficient $C_{Fr}$ is larger than the rear-side damping coefficient $C_{Rr}$. In this modified arrangement, the pitch-vibration damping control is executed by the adjuster devices 54 without the roll-vibration damping control being executed.

As described above, in the present suspension system 10, when the vehicle is in the low vibration intensity situation, each of the plurality of vibration damping controls is executed as little as possible, so that the generation of the displacement force by each adjuster device 54 is limited. It is therefore possible to restrain ride comfort of the vehicle from being deteriorated by the displacement force. Further, in the present system 10, it is possible to further effectively restrain the ride comfort of the vehicle from being deteriorated by the displacement force, since the generation of the displacement force by each adjuster device 54 can be further limited by utilizing the shock absorbers 52.

<Controlling Programs>

Figure 17:
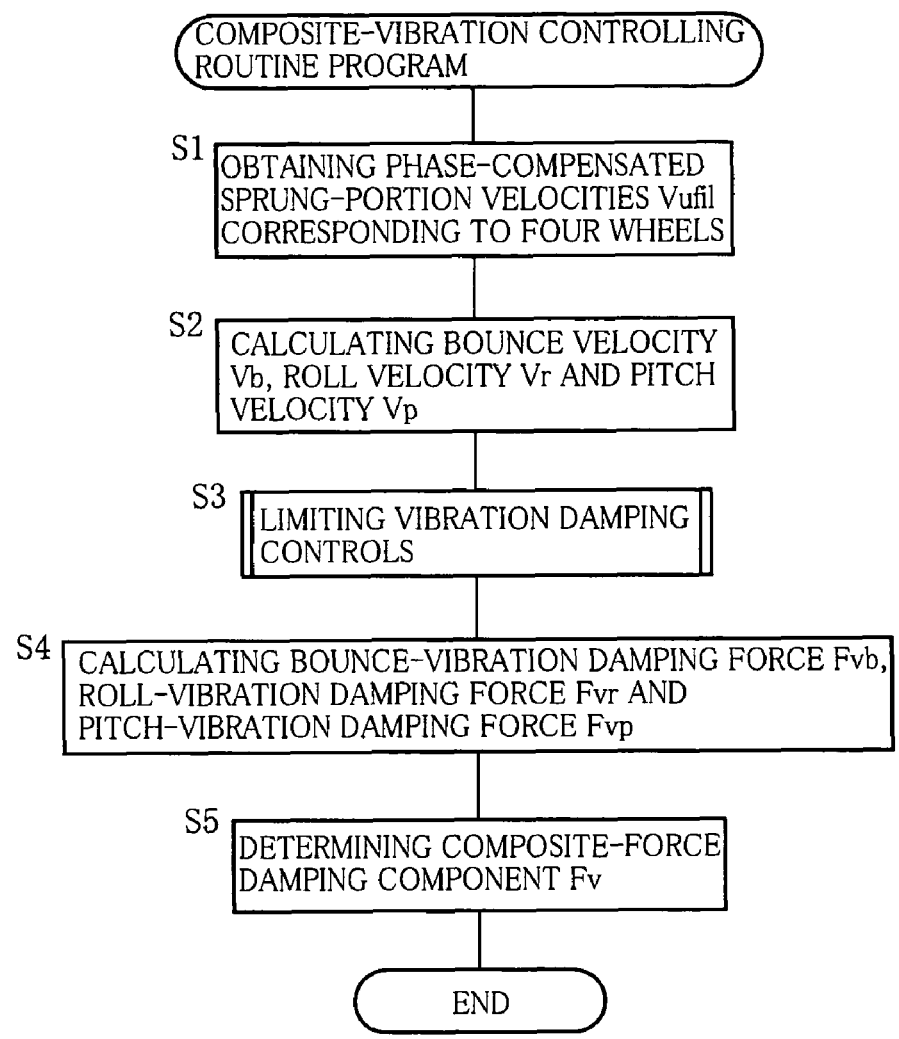
FIG. 17 is a flow chart showing a composite-vibration controlling routine program that is to be executed by the suspension electronic control unit of FIG. 12.
Figure 19:
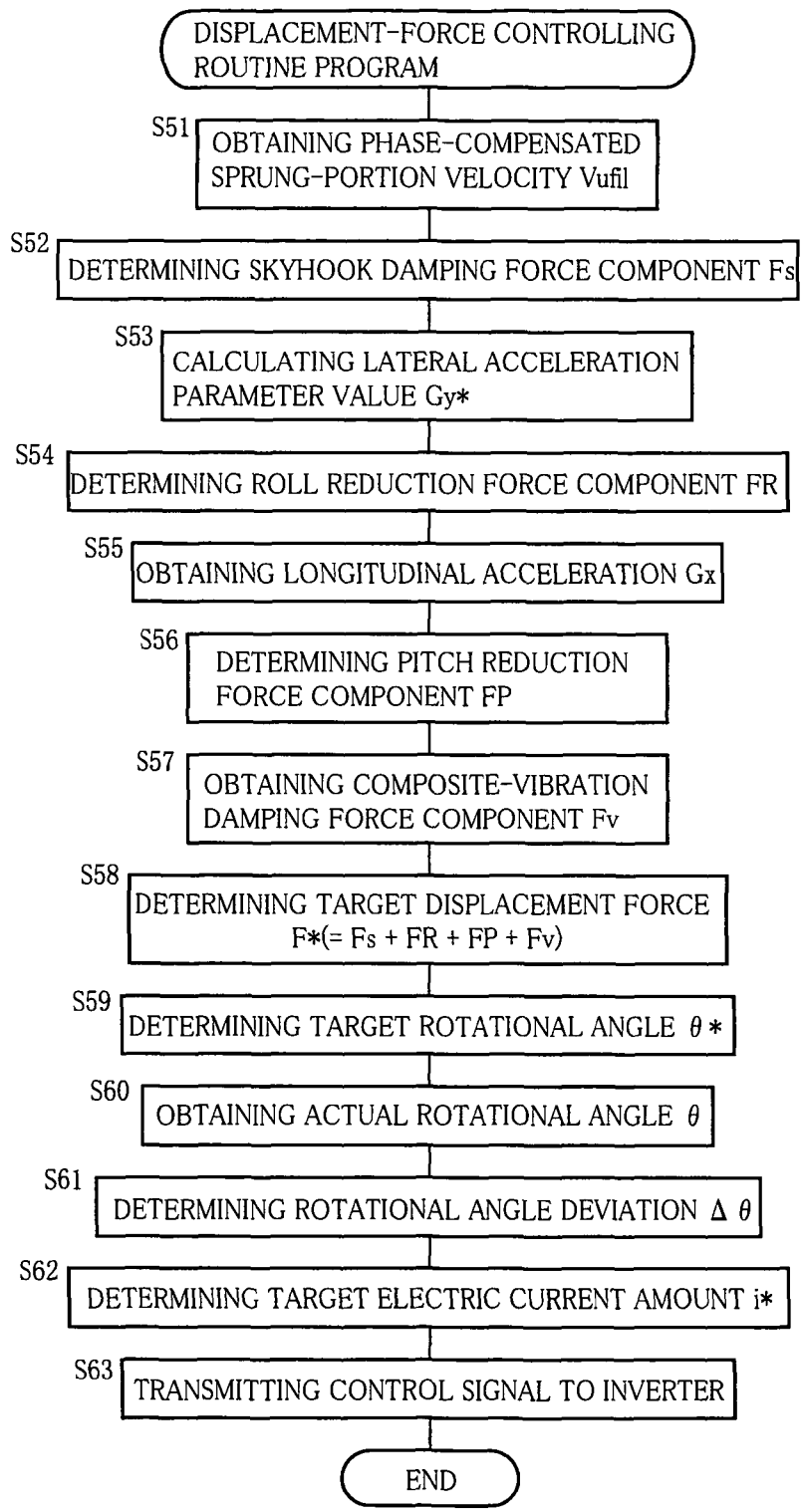
FIG. 19 is a flow chart showing a displacement-force controlling routine program that is to be executed by the suspension electronic control unit of FIG. 12.

The present suspension system 10 is controlled by executing a composite-vibration controlling routine program shown in flow chart of FIG. 17 and a displacement-force controlling routine program shown in flow chart of FIG. 19. Each of these two routine programs is repeatedly executed by the ECU 200 at a short time interval (e.g., several tens of milliseconds), while an ignition switch of the vehicle is placed in its ON state. The routine programs will be described with reference to the flow charts of FIGS. 17 and 19. It is noted that the displacement-force controlling routine program is executed for each one of the four adjuster devices 54 that are provided for the respective four wheels 12. In the following description, the displacement-force controlling routine program will be described by describing control procedures performed for one of the four adjuster devices 54, in the interest of simplification of the description.

(i) Composite-Vibration Controlling Routine Program

The composite-vibration controlling routine program is initiated with step S1 that is implemented to obtain the phase-compensated sprung-portion absolute velocities $Vu_{fil}$ in the respective four sprung portions (corresponding to the respective four wheels 12). Step S1 is followed by step S2 in which the bounce velocity $V_b[=(V_{FR}+V_{FL}V_{RR}V_{RL})/4]$, roll velocity $V_r[=(V_{FR}-V_{FL}+V_{RR}-V_{RL})/4]$ and pitch velocity Vp [=($V_{FR}$+$V_{FL}$−$V_{RR}$−$V_{RL}$)/4] are calculated by taking account of the distance between each wheel 12 and the center of gravity of the vehicle.

Figure 18:
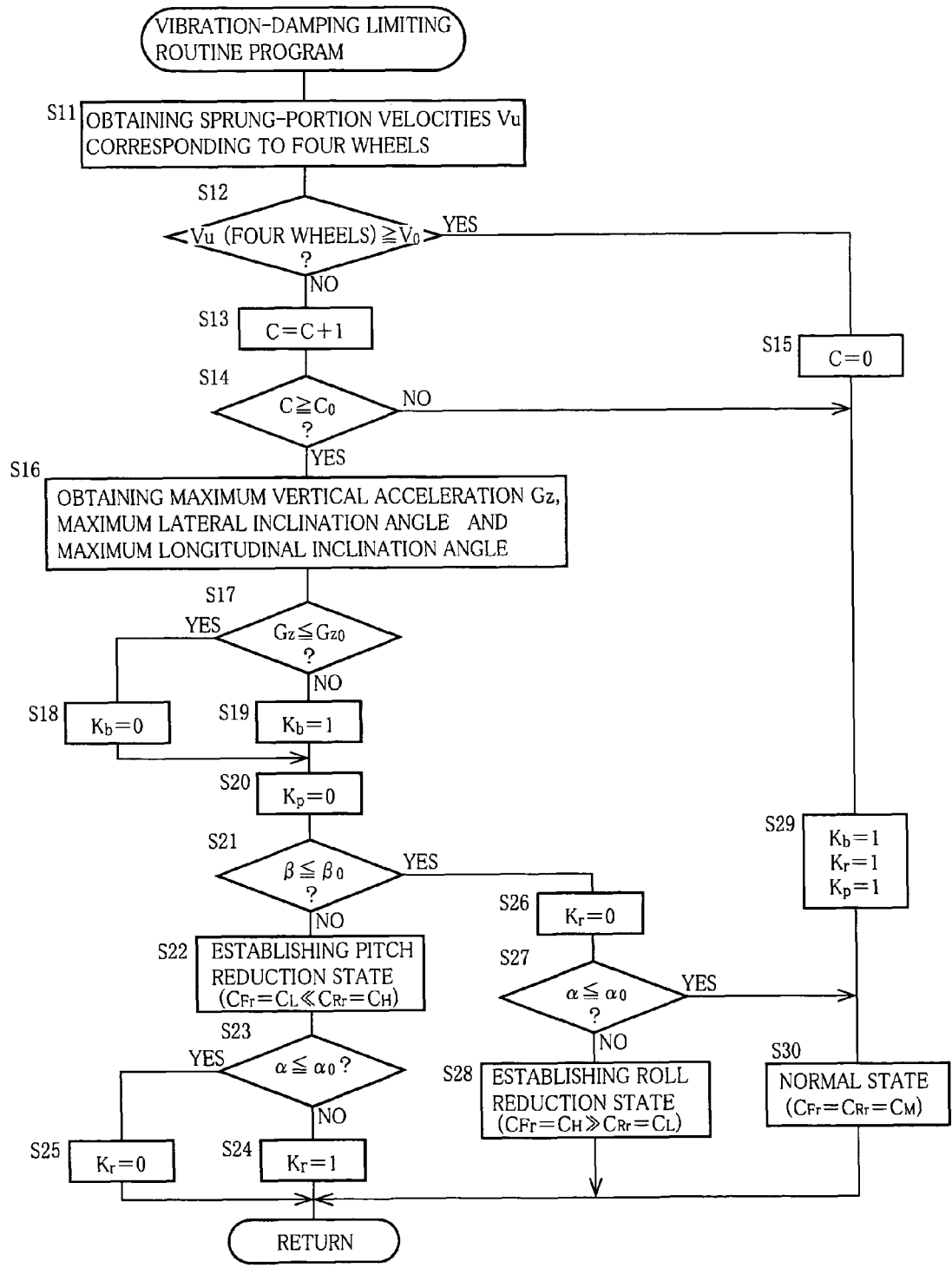
FIG. 18 is a flow chart showing a vibration-damping limiting routine program as a sub-routine program of the composite-vibration controlling routine program of FIG. 17.

Then, in step S3, it is judged whether execution of each of the three vibration damping controls (i.e., the bounce-vibration damping control, roll-vibration damping control and pitch-vibration damping control) is to be limited or not. The determination is made by executing a vibration-damping limiting routine program that is shown in a flow chart of FIG. 18. In execution of the vibration-damping limiting routine program, it is first determined whether the vehicle is currently in the low vibration intensity situation, namely, whether the intensities of the sprung-portion resonance frequency components in the respective four sprung portions (corresponding to the four wheels 12) are lower than the threshold intensity degree. Described specifically, the vibration-damping limiting routine program is initiated with step S11 in which the sprung-portion absolute velocities $V_U$ in the respective four sprung portions are obtained. Step S11 is followed by step S12 that is implemented to judge whether at least one of the sprung-portion absolute velocities $V_U$ is equal to or higher than the threshold velocity value $V_0$. When at least one of the sprung-portion absolute velocities $V_U$ is equal to or higher than the threshold velocity value $V_0$, it is regarded that the vibration of the sprung-portion resonance-frequency range is occurring in the vehicle body, and all of the switching gains $K_b$, $K_r$, $K_p$ are set to "1" (one) in step S29. In this case, the motor 100 of each shock absorber 52 is controlled in step S30 such that the damping coefficients of the respective four shock absorbers 52 are set to the standard damping level $C_M$.

When it is judged in step S12 that all of the sprung-portion absolute velocities $V_U$ in the respective four sprung portions are lower than the threshold velocity value $V_0$, it is judged that the vehicle is currently in the low vibration intensity situation, so that each of the vibration damping controls is executed as little as possible. More precisely described, when all of the maximum values of the sprung-portion absolute velocities $V_U$ within a predetermined length $t_0$ of time up to a current point of time are lower than a threshold velocity value $V_0$, it is judged that the vehicle is currently in the low vibration intensity situation. Specifically, when all of the sprung-portion absolute velocities $V_U$ in the respective four sprung portions are lower than the threshold velocity value $V_0$, the control flow goes to step S13 to increment a time counter, which serves to judge whether the predetermined length $t_0$ of time has passed since all of the sprung-portion absolute velocities $V_U$ in the respective four sprung portions become lower than the threshold velocity value $V_0$. In step S14, a counted value C of the time counter is compared with a threshold counted value $C_0$ that corresponds to the above-described predetermined length $t_0$ of time. When at least one of the sprung-portion absolute velocities $V_U$ becomes equal to or higher than the threshold velocity value $V_0$, step S15 is implemented to reset the time counter. As long as the counted value C is smaller than the threshold counted value $C_0$, namely, as long as a negative decision (NO) is obtained in step S14, all of the vibration damping controls are executed in step S29 and steps following step S29. When an affirmative decision (YES) is obtained in step S14, it is judged that the vehicle is currently in the low vibration intensity situation.

In the low vibration intensity situation, when an intensity of at least one of the bounce vibration, roll vibration and pitch vibration is relatively high, the at least one of the vibrations is damped. When the affirmative decision (YES) is obtained in step S14, the control flow goes to step S16 that is implemented to obtain the maximum sprung-portion acceleration values $G_Z$ (as the maximum value of the average of the sprung-portion acceleration values $G_U$ within the predetermined length $t_0$ of time up to the current point of time), the maximum lateral inclination angle α (as the maximum value of the lateral inclination angle within the predetermined length $t_0$ of time up to the current point of time) and the maximum longitudinal inclination angle β (as the maximum value of the longitudinal inclination angle within the predetermined length $t_0$ of time up to the current point of time), which serve indexes for estimating the intensities of the bounce vibration, roll vibration and pitch vibrations. Then, when it is judged in step S17 that the maximum sprung-portion acceleration values $G_Z$ is equal to or lower than the threshold value $G_{Z0}$, the switching gain $K_b$ for the bounce-vibration damping control is set to "0" (zero). When it is judged in step S17 that the maximum sprung-portion acceleration values $G_Z$ is higher than the threshold value $G_{Z0}$, the switching gain $K_b$ for the bounce-vibration damping control is set to "1" (one). Then, step S21 is implemented to judge whether the maximum longitudinal inclination angle β is equal to or lower than the threshold value $β_0$. When the maximum longitudinal inclination angle β is higher than the threshold value $β_0$, namely, when the pitch vibration is to be suppressed, the pitch reduction state is established by the four shock absorbers 52, in place of execution of the pitch-vibration damping control executed by the adjuster devices 54. That is, in step S22, the motor 100 of each of the shock absorbers 52 is controlled such that the front-side damping coefficient $C_{Fr}$ and the rear-side damping coefficient $C_{Rr}$ are set to the low damping level $C_L$ and the high damping level $C_H$, respectively, for thereby establishing the second state in which the rear-side damping coefficient $C_{Rr}$ is larger than the front-side damping coefficient $C_{Fr}$. It is noted that the switching gain $K_p$ for the pitch-vibration damping control is set to "0" (zero) in step S20, since the pitch-vibration damping control is never executed during the low vibration intensity situation in the present system 10.

When the pitch reduction state is established by the shock absorbers 52, the control flow goes to step S23 in which it is judged whether the maximum lateral inclination angle α is equal to or smaller than the threshold value $α_0$. When the maximum lateral inclination angle α is equal to or smaller than the threshold value $α_0$, the switching gain $K_r$ for the roll-vibration damping control is set to "0" (zero). When the maximum lateral inclination angle α is larger than the threshold value $α_0$, the switching gain $K_r$ for the roll-vibration damping control is set to "1" (one). Further, when it is judged in step S21 that the maximum longitudinal inclination angle β is equal to or lower than the threshold value $β_0$, step S27 is implemented judge whether the maximum lateral inclination angle α is equal to or smaller than the threshold value $α_0$. When the maximum lateral inclination angle α is larger than the threshold value $α_0$, namely, when the roll vibration is to be suppressed, the roll reduction state is established by the four shock absorbers 52, in place of execution of the roll-vibration damping control executed by the adjuster devices 54. That is, in step S28, the motor 100 of each of the shock absorbers 52 is controlled such that the front-side damping coefficient $C_{Fr}$ and the rear-side damping coefficient $C_{Rr}$ are set to the high damping level $C_H$ and the low damping level $C_L$, respectively, for thereby establishing the first state in which the front-side damping coefficient $CF_r$ is larger than the rear-side damping coefficient $C_{Rr}$. It is noted that the switching gain $K_r$ for the roll-vibration damping control is set to "0" (zero) in step S26 since the roll-vibration damping control is never executed when it is judged in step S21 that the maximum longitudinal inclination angle β is equal to or smaller than the threshold value $β_0$.

After the switching gains $K_b$, $K_r$, $K_p$ have been determined by execution of the vibration-damping limiting routine program, the control flow goes to step S4 of the composite-vibration controlling routine program that is implemented to calculate the bounce-vibration damping force $F_{Vb}K_b \cdot C_b \cdot V_b$), roll-vibration damping force $F_{Vr}(=K_r \cdot C_r \cdot V_r)$ and pitch-vibration damping force $F_{Vp}(=K_p \cdot C_p \cdot V_p)$, based on the bounce velocity $V_b$, roll velocity $V_r$, and pitch velocity $V_p$, respectively. Then, in step S5, each of the bounce-vibration damping force $F_{Vb}$, roll-vibration damping force $F_{Vr}$ and pitch-vibration damping force $F_{Vp}$ is divided among the four adjuster devices 54 provided for the respective four wheels 12, and the composite-vibration damping force component $F_V$ which is to be generated by each of the four adjuster devices 54 is determined. One cycle of execution of the composite-vibration controlling routine program is completed with step S5.

(ii) Displacement-Force Controlling Routine Program

In execution of the displacement-force controlling routine program, the skyhook damping force component $F_S$ (that is to be directed to the skyhook control), the roll-reduction force component $F_R$ (that is to be directed to the roll-reduction control) and the pitch-reduction force component $F_P$ (that is to be directed to the pitch-reduction control) are determined in manners as described above. The skyhook damping force component $F_S$ is determined in steps S51 and S52. The roll-reduction force component $F_R$ is determined in steps S53 and S54. The pitch-reduction force component $F_P$ is determined in steps S55 and S56. After steps S51-S56 have been implemented, step S57 is implemented to obtain the composite-vibration damping force component $F_V$ which has been determined in execution of the composite-vibration controlling routine program and which is to be generated by the corresponding adjuster devices 54. Then, step S58 is implemented to determine the target displacement force F* as a sum of the skyhook damping force component $F_S$, roll-reduction force component $F_R$, pitch-reduction force component $F_P$ and composite-vibration damping force component $F_V$. Step S58 is followed by step S59 in which the target rotational angle θ* is determined based on the target displacement force F*. Then, in step S62, the target electric current amount i* is determined based on the target rotational angle θ* and the above-described expression in accordance with the PI control rule. One cycle of execution of the displacement-force controlling routine program is completed with step S63 in which a control signal based on the determined target electric current amount i* is transmitted to the inverter 206. The displacement-force controlling routine program is carried out for each of the adjuster devices 54, so that the motors 170 of the respective adjuster devices 54 are controlled whereby each of the adjuster devices 54 is caused to generate a required amount of the displacement force.

<Functional Construction of Control Unit>

The ECU 200 as the control unit of the present suspension system 10 performs various procedures as described above, by executing the composite-vibration controlling routine program and the displacement-force controlling routine program. The ECU 200 can be considered to include functional portions as shown in FIG. 12, in view of the procedures performed by the executions of the controlling routine programs. The ECU 200 includes basic control portions in the form of a skyhook damping force component determiner 302, a roll-reduction force component determiner 304 and a pitch-reduction force component determiner 306. The skyhook damping force component determiner 302 is a functional portion assigned to implement steps S51 and S52, namely, a functional portion configured to determine the skyhook damping force component $F_S$. The roll-reduction force component determiner 304 is a functional portion assigned to implement steps S53 and S54, namely, a functional portion configured to determine the roll-reduction force component $F_R$. The pitch-reduction force component determiner 306 is a functional portion assigned to implement steps S55 and S56, namely, a functional portion configured to determine the pitch-reduction force component $F_P$.

Figure 13:
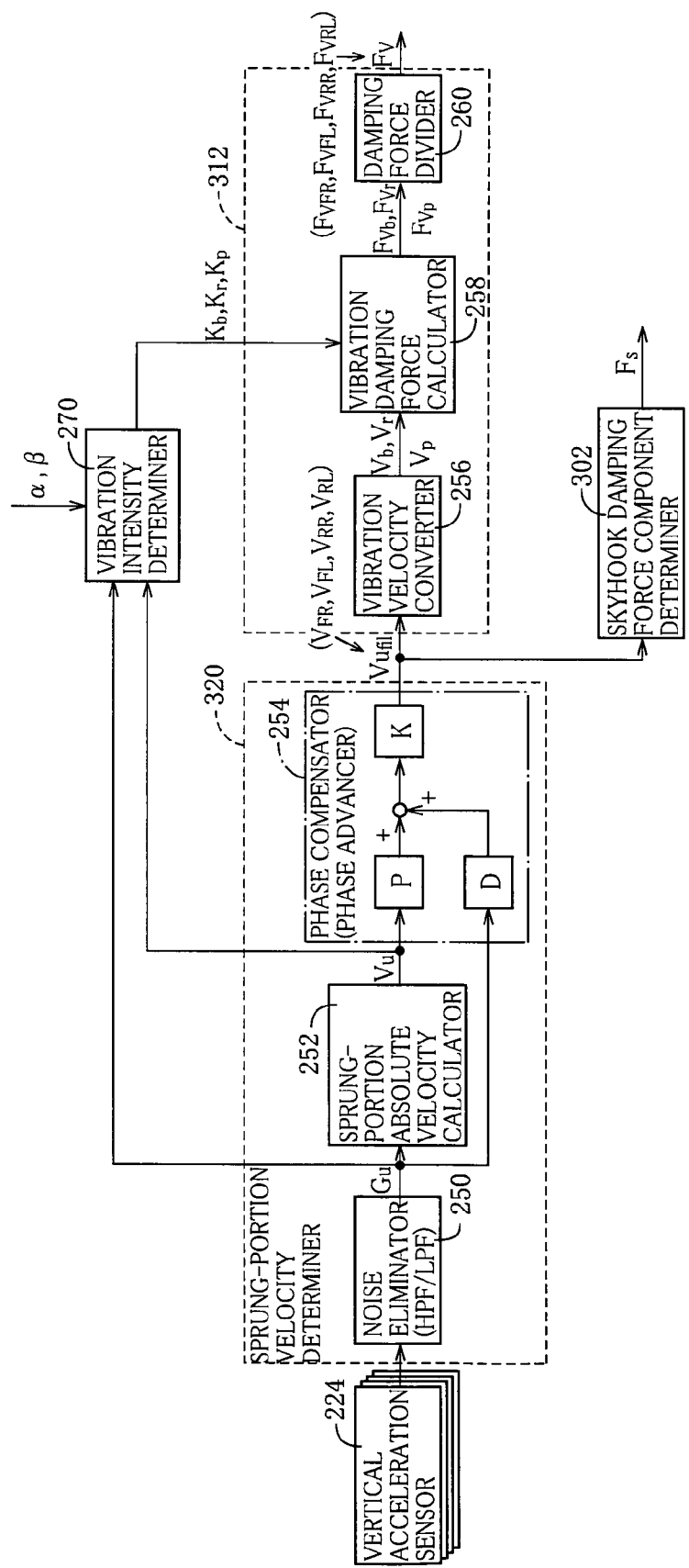
FIG. 13 is a block diagram showing, further in detail, some of the functional portions of the suspension electronic control unit.

The ECU 200 further includes a composite-vibration control executer 310 as a functional portion assigned to carry out procedures according to the composite-vibration controlling routine program. The composite-vibration control executer 310 includes, in addition to the above-described vibration intensity determiner 270, a vibration-damping force component determiner 312 and a vibration reduction state establisher 314. The vibration intensity determiner 270 is configured to carry out procedures according to the vibration-damping limiting routine program, so as to judge whether the intensities of the sprung-portion resonance frequency components in the respective four sprung portions (corresponding to the four wheels 12) are lower than the threshold intensity degree, and also judge whether the intensities of the vibrations that are to be damped in the respective vibration damping controls are equal to or lower than the respective threshold intensity degrees. The vibration-damping force component determiner 312 is configured to determine the composite-vibration damping force component $F_V$, based on result of judgment of the vibration intensity determiner 270. The vibration reduction state establisher 314 is configured to establish, based on the result of the judgment of the vibration intensity determiner 270, the pitch reduction state suitable for damping the pitch vibration or the roll reduction state suitable for damping the roll vibration, by controlling damping coefficients of the respective four shock absorbers 52. As shown in FIG. 13, the vibration-damping force component determiner 312 includes the above-described vibration velocity converter 256, vibration damping force calculator 258 and damping force divider 260 that are assigned to implement steps S2, S4 and S5 of the composite-vibration controlling routine program, respectively. The vibration reduction state establisher 314 includes functional portions assigned to implement steps S22 and S28 of vibration-damping limiting routine program for establishing the pith reduction state and the roll reduction state, respectively.

Further, the ECU 200 includes a sprung-portion velocity determiner 320 which includes the above-described noise eliminator 250, sprung-portion absolute velocity calculator 252 and phase compensator 254, and which is configured to determine the sprung-portion velocities that are used for determining the displacement force components.

<Modification of Embodiment>

In the above-described embodiment, the roll reduction state and the pitch reduction state are selectively established by controlling the damping coefficients of the respective four shock absorbers 52, so that the roll vibration or the pitch vibration is suppressed by utilizing the shock absorbers 52 in place of the adjuster devices 54 when the roll vibration or the pitch vibration is to be suppressed in the low vibration intensity situation. However, the embodiment may be modified such that the shock absorbers are not utilized in the low vibration intensity situation, so that the present invention is applicable also for a suspension system in which each of four shock absorbers does not have the above-described damping coefficient changer. In a system constructed according to a modification of the embodiment, it is judged whether each of the three vibration damping controls is to be executed depending on whether an intensity of vibration that is to be damped by the each of the vibration damping controls is higher than a threshold intensity degree. Described in detail, the intensities of the bounce vibration, roll vibration and pitch vibration are estimated based on the vertical acceleration of the vehicle body, the lateral inclination angle and the longitudinal inclination angle, respectively. When each of the maximum sprung-portion acceleration value $G_Z$ (as a maximum value of the sprung-portion acceleration within the predetermined length $t_0$ of time up to the current point of time), maximum lateral inclination angle $\alpha$ (as a maxim value of the lateral inclination angle within the predetermined length $t_0$ of time up to the current point of time) and maximum longitudinal inclination angle $\beta$ (as a maximum value of the lateral inclination angle within the predetermined length $t_0$ of time up to the current point of time) is not larger than a corresponding one of the threshold values $G_{Z0}$, $\alpha_0$, $\beta_0$, a corresponding one of the bounce-vibration damping control, roll-vibration damping control and pitch-vibration damping control is not executed. In the system according to this modification of the embodiment, a total of eight operational modes A, B, C, D, E, F, G and H are selectively established, as shown in FIG. 20A, depending on the maximum sprung-portion acceleration value $G_Z$, maximum lateral inclination angle $\alpha$ and maximum longitudinal inclination angle $\beta$. FIG. 20B shows values of the respective switching gains $K_b$, $K_r$, $K_p$ (that are directed to the respective vibration damping controls) in each of the operational modes A-H.

In the above-described embodiment and modification, the intensities of the bounce vibration, roll vibration and pitch vibration are estimated based on the vertical acceleration of the vehicle body, the lateral inclination angle and the longitudinal inclination angle, respectively. However, they may be estimated, for example, based on the bounce velocity, roll velocity and pitch velocity, respectively.

The invention claimed is:

1. A suspension system for a vehicle having front right, front left, rear right and rear left wheels, four sprung portions and four unsprung portions, said suspension system comprising:

(a) four displacement force generators provided for the respective four wheels of the vehicle, each of said four displacement force generators including an electromagnetic motor and configured to generate, based on a motor force generated by said electromagnetic motor, a displacement force forcing a corresponding one of the four sprung portions and a corresponding one of the four unsprung portions toward or away from each other; and (b) a control unit configured to control actuation of said electromagnetic motor included in each of said four displacement force generators, so as to control the displacement force that is to be generated by each of said four displacement force generators, wherein said control unit is configured to be capable of executing a plurality of vibration damping controls concurrently with each other, by controlling the displacement force based on a sum of vibration damping components as displacement force components that are to be generated by each of said four displacement force generators in the respective vibration damping controls, so as to damp a composite vibration occurring in a body of the vehicle and containing a plurality of vehicle-body vibrations which are different in kind from each other and which are to be damped by respective vibration damping forces generated by said four displacement force generators in the respective vibration damping controls, wherein said control unit is configured to determine each of the vibration damping components into which a corresponding one of the vibration damping forces is to be divided among said four displacement force generators, wherein said control unit is configured to be capable of executing, as said plurality of vibration damping controls, at least (i) a roll-vibration damping control that is to be executed for damping a roll vibration as one of said plurality of vehicle-body vibrations, (ii) a pitch-vibration damping control that is to be executed for damping a pitch vibration as one of said plurality of vehicle-body vibrations, and (iii) a bounce-vibration damping control that is to be executed for damping a bounce vibration as one of said plurality of vehicle-body vibrations, and wherein said control unit is configured to refrain from executing at least one of said plurality of vibration damping controls in a low vibration intensity situation in which intensities of sprung-portion resonance-frequency vibration components in the respective four sprung portions are lower than a threshold intensity degree, each of said at least one of said plurality of vibration damping controls being to be executed for damping one of said plurality of vehicle-body vibrations that is not required to be damped in said low vibration intensity situation, each of the sprung-portion resonance-frequency vibration components being a component of sprung-portion vibration occurring in a corresponding one of the four sprung portions and having a resonance frequency of the corresponding one of the four sprung portions.

2. The suspension system according to claim 1, wherein said control unit is configured to judge whether the vehicle is in said low vibration intensity situation, based on sprung-portion velocities as vertical movement velocities of the respective four sprung portions.

3. The suspension system according to claim 1 claim 1, wherein said control unit is configured, in said low vibration intensity situation, to judge whether each of said plurality of vibration damping controls is to be required to be executed or not, based on an intensity of a corresponding one of the vehicle-body vibrations that is to be damped in said each of said plurality of vibration damping controls, wherein said control unit is configured to judge that each of said plurality of vibration damping controls is to be not required to be executed when the intensity of the corresponding one of the vehicle-body vibrations is not larger than a corresponding one of threshold values, and wherein said control unit is configured, in said low vibration intensity situation, to refrain from executing at least one of said plurality of vibration damping controls, each of said at least one of said plurality of vibration damping controls being judged to be not required to be executed.

4. The suspension system according to claim 1, wherein said control unit is configured to be capable of executing, as one of said plurality of vibration damping controls, at least a roll-vibration damping control that is to be executed for damping a roll vibration as one of said plurality of vehicle-body vibrations, and wherein said control unit is configured, in said low vibration intensity situation, to refrain from executing the roll-vibration damping control when an intensity of the roll vibration is not higher than a threshold intensity degree.

5. The suspension system according to claim 1, wherein said control unit is configured to be capable of executing, as one of said plurality of vibration damping controls, at least a pitch-vibration damping control that is to be executed for damping a pitch vibration as one of said plurality of vehicle-body vibrations, and wherein said control unit is configured, in said low vibration intensity situation, to refrain from executing the pitch-vibration damping control when an intensity of the pitch vibration is not higher than a threshold intensity degree.

6. The suspension system according claim 1, wherein said control unit is configured to be capable of executing, as one of said plurality of vibration damping controls, at least a bounce-vibration damping control that is to be executed for damping a bounce vibration as one of said plurality of vehicle-body vibrations, and wherein said control unit is configured, in said low vibration intensity situation, to refrain from executing the bounce-vibration damping control when an intensity of the bounce vibration is not higher than a threshold intensity degree.

7. The suspension system according to claim 1, wherein said control unit is configured, upon execution of each of said plurality of vibration damping controls, to determine a corresponding one of the vibration damping components that is to be directed to said each of said plurality of vibration damping controls, based on a velocity of a corresponding one of said plurality of vehicle-body vibrations that is to be damped by said each of said plurality of vibration damping controls, and wherein each of said four displacement force generators is controlled by said control unit so as to generate, upon execution of said each of said plurality of vibration damping controls, the displacement force such that an amount of the generated displacement force is based on said corresponding one of the vibration damping components.

8. The suspension system according to claim 7, wherein said control unit is configured to estimate the velocity of said corresponding one of said plurality of vehicle-body vibrations, based on sprung-portion velocities as vertical movement velocities of the respective four sprung portions.

9. The suspension system according to claim 8, further comprising a vibration phase advancer that is configured to obtain advanced sprung-portion vibrations by advancing phase of the sprung-portion vibration that occurs in each of the four sprung portions, such that the sprung-portion velocities are the vertical movement velocities of the respective four sprung portions in the advanced sprung-portion vibrations, whereby the velocity of said corresponding one of said plurality of vehicle-body vibrations is estimated based on the advanced sprung-portion vibrations.

10. The suspension system according to claim 1, further comprising:

(c) four suspension springs provided for the respective four wheels, each of said four suspension springs elastically interconnecting between a corresponding one of the four sprung portions and a corresponding one of the four unsprung portions; and (d) four hydraulic shock absorbers provided for the respective four wheels, each of said four hydraulic shock absorbers being configured to generate a damping force against displacement of a corresponding one of the four sprung portions and a corresponding one of the four unsprung portions relative to each other.

11. The suspension system according to claim 10, wherein each of said four hydraulic shock absorbers has a damping coefficient changer configured to change a damping coefficient of said each of said four hydraulic shock absorbers which corresponds to ability of said each of said four hydraulic shock absorbers for generating the damping force such that an amount of the generated damping force is based on the damping coefficient, and wherein said control unit is configured to control said damping coefficient changer of each of said four hydraulic shock absorbers, for thereby controlling the damping coefficient of said each of said four hydraulic shock absorbers.

12. The suspension system according to claim 11,
wherein said four hydraulic shock absorbers consist of two front-side shock absorbers provided for the front wheels and two rear-side shock absorbers provided for the rear wheels,
and wherein said control unit is configured to control the damping coefficient of each of said four hydraulic shock absorbers, for thereby selectively establishing a first state in which the damping coefficient of each of said two front-side shock absorbers is made larger than the damping coefficient of each of said two rear-side shock absorbers and a second state in which the damping coefficient of each of said two rear-side shock absorbers is made larger than the damping coefficient of each of said two front-side shock absorbers, and thereby selectively establishing a pitch reduction state suitable for reducing a pitch vibration as one of said plurality of vehicle-body vibrations and a roll reduction state suitable for reducing a roll vibration as one of said plurality of vehicle-body vibrations, by selectively establishing the first and second states.

13. The suspension system according to claim 12,
wherein said control unit is configured to establish, as said pitch reduction state, one of said first and second states that is predetermined based on a relationship between a front-side resonance frequency as the resonance frequency of each of front two of the four sprung portions that correspond to the front wheels and a rear-side resonance frequency as the resonance frequency of each of rear two of the four sprung portions that correspond to the rear wheels,
and wherein said control unit is configured to establish, as said roll reduction state, the other of said first and second states that is predetermined based on the relationship between the front-side resonance frequency and the rear-side resonance frequency.

14. The suspension system according to claim claim 12,
wherein said control unit is configured to establish, as said pitch reduction state, a selected one of said first and second states that is selected depending on a front-wheel-side-portion maximum displacement time and a rear-wheel-side-portion maximum displacement time during a forward running of the vehicle over a protrusion or a recess on a road surface, such that said first state and said second state are established as said pitch reduction state and said roll reduction state, respectively, where said front-wheel-side-portion maximum displacement time is shorter than said rear-wheel-side-portion maximum displacement time, and such that said first state and said second state are established as said roll reduction state and said pitch reduction state, respectively, where said rear-wheel-side-portion maximum displacement time is shorter than said front-wheel-side-portion maximum displacement time,
where said front-wheel-side-portion maximum displacement time is defined as a length of time from a point of time at which the front wheels reach the protrusion to a point of time at which an amount of displacement of front two of the four sprung portions that correspond to the front wheels in a rebound direction is maximized, or as a length of time from a point of time at which the front wheels reach the recess to a point of time at which an amount of displacement of the front two of the four sprung portions in a bound direction is maximized, and
said rear-wheel-side-portion maximum displacement time is defined as a length of time from the point of time at which the front wheels reach the protrusion to a point of time at which an amount of displacement of rear two of the four sprung portions that correspond to the rear wheels in the rebound direction is maximized, or as a length of time from the point of time at which the front wheels reach the recess to a point of time at which an amount of displacement of the rear two of the four sprung portions in the bound direction is maximized.

15. The suspension system according to claim 12,
wherein said control unit is configured to be capable of executing, as said plurality of vibration damping controls, at least a roll-vibration damping control and a pitch-vibration damping control that are to be executed for damping roll and pitch vibrations, respectively, as said plurality of vehicle-body vibrations,
and wherein said control unit is configured, when at least one of the roll and pitch vibrations is required to be damped in said low vibration intensity situation, to establish said roll reduction state by controlling the damping coefficient of each of said four hydraulic shock absorbers while not executing said roll-vibration damping control, or to establish said pitch reduction state by controlling the damping coefficient of each of said four hydraulic shock absorbers while not executing said pitch-vibration damping control.

16. The suspension system according to claim 15,
wherein said control unit is configured, when an intensity of the roll vibration is higher than a threshold intensity degree while an intensity of the pitch vibration is not higher than a threshold intensity degree in said low vibration intensity situation, to establish said roll reduction state by controlling the damping coefficient of each of said four hydraulic shock absorbers while not executing said roll-vibration damping control and said pitch-vibration damping control,
and wherein said control unit is configured, when the intensity of the roll vibration is not higher than the threshold intensity degree while the intensity of the pitch vibration is higher than the threshold intensity degree in said low vibration intensity situation, to establish said pitch reduction state by controlling the damping coefficient of each of said four hydraulic shock absorbers while not executing said roll-vibration damping control and said pitch-vibration damping control.

17. The suspension system according to claim 15, wherein said control unit (200) unit is configured, when an intensity of the roll vibration and an intensity of the pitch vibration are higher than respective threshold intensity degrees in said low vibration intensity situation, to establish said roll reduction state by controlling the damping coefficient of each of said four hydraulic shock absorbers while executing said pitch-vibration damping control without executing said roll-vibration damping control, or to establish said pitch reduction state by controlling the damping coefficient of each of said four hydraulic shock absorbers while executing said roll-vibration damping control without executing said pitch-vibration damping control.

18. The suspension system according to claim 1,
wherein each of said four displacement force generators which is configured to generate the displacement force forcing a corresponding one of the four sprung portions and a corresponding one of the four unsprung portions toward or away from each other, includes (a-1) an elastic body connected at one of opposite end portions thereof to one of the corresponding sprung portion and the corresponding unsprung portion, and (a-2) an electromagnetic actuator which is disposed between the other of said opposite end portions of said elastic body and the other of the corresponding sprung portion and the corresponding unsprung portion and which interconnects said elastic body and said other of the corresponding sprung portion and the corresponding unsprung portion, and wherein said electromagnetic actuator includes said electromagnetic motor, and is configured to generate an actuator force based on the motor force generated by said electromagnetic motor, such that the generated actuator force acts on said elastic body so as to change an amount of deformation of said elastic body that is dependent on an amount of actuation of said actuator, and such that the generated actuator force is transmitted to the corresponding sprung portion and the corresponding unsprung portion via said elastic body so as to act as the displacement force.

19. The suspension system according to claim 18,
wherein said elastic body includes (a-1-i) a shaft portion which is rotatably held by the corresponding sprung portion and (a-1-ii) an arm portion which extends from one of opposite end portions of said shaft portion in a direction intersecting said shaft portion and which is connected at a distal end portion thereof to the corresponding unsprung portion, and wherein said actuator is fixed to a body of the vehicle, and is configured to rotate said shaft portion about an axis of said shaft portion by the actuator force generated by said actuator.

20. The suspension system according to claim 18, wherein said actuator is configured to have a positive/negative efficiency product that is not larger than 1/2, where the positive/negative efficiency product is defined as a product of a positive efficiency of said actuator and a negative efficiency of said actuator, the positive efficiency is defined as a ratio of an amount of an external force acting on said actuator, to an amount of the motor force minimally required to cause the actuation of said actuator against the external force, and the negative efficiency is defined as a ratio of an amount of the motor force minimally required to inhibit said actuator from being actuated by an external force acting on said actuator, to an amount of the external force.

21. The suspension system according to claim 18,
wherein said actuator includes a speed reducer configured to decelerate motion that is inputted from said electromagnetic motor, and is configured to output the decelerated motion as the actuation of said actuator, and wherein said speed reducer has a reduction gear ratio that is not higher than 1/100.

* * * * *